United States Patent
Cheng et al.

(10) Patent No.: US 6,906,495 B2
(45) Date of Patent: Jun. 14, 2005

(54) CONTACT-LESS POWER TRANSFER

(75) Inventors: Lily Ka Lai Cheng, Cambridge (GB); James Westwood Hay, Cambridge (GB); Pilgrim Giles William Beart, Cambridge (GB)

(73) Assignee: Splashpower Limited, Cambridge (GB)

( * ) Notice: Subject to any disclaimer, the term of this patent is extended or adjusted under 35 U.S.C. 154(b) by 0 days.

(21) Appl. No.: 10/326,571

(22) Filed: Dec. 20, 2002

(65) Prior Publication Data

US 2003/0210106 A1 Nov. 13, 2003

(30) Foreign Application Priority Data

| May 13, 2002 | (GB) | .............................................. 0210886 |
| Jun. 7, 2002 | (GB) | .............................................. 0213024 |
| Dec. 6, 2002 | (GB) | .............................................. 0228425 |

(51) Int. Cl.$^7$ ........................ H01M 10/44; H01M 10/46
(52) U.S. Cl. ..................................................... 320/108
(58) Field of Search .......................... 320/108; 336/115, 336/118, 130

(56) References Cited

U.S. PATENT DOCUMENTS

| 2,415,688 A | 2/1947 | Hall, Jr. ....................... 219/206 |
| 2,967,267 A | 1/1961 | Steinman et al. ........... 361/730 |
| 3,277,358 A | 10/1966 | Nicholl ........................ 320/111 |
| 3,414,796 A | 12/1968 | Henquet ..................... 320/108 |
| 3,673,334 A | 6/1972 | Turner |
| 3,938,018 A | 2/1976 | Dahl .......................... 320/140 |
| 4,031,449 A | 6/1977 | Trombly ..................... 320/108 |
| 4,379,988 A | 4/1983 | Mattatall .................... 320/108 |
| 4,675,638 A | 6/1987 | Szabo |
| 4,692,604 A | 9/1987 | Billings ...................... 235/493 |

(Continued)

FOREIGN PATENT DOCUMENTS

| DE | 29706497 U1 | 7/1997 |
| DE | 19649682 A1 | 6/1998 |
| EP | 0 187 526 A2 | 7/1986 |
| EP | 0218142 A2 | 9/1986 |
| EP | 0491214 A1 | 6/1992 |

(Continued)

OTHER PUBLICATIONS

K. Hatanaka, et al., Coil Shape in a Desk–Type Contactless Power Station System, Jan. 24, 2001, pp. 1015–1018, vol. 25, No. 4–2, JAPAN.

(Continued)

*Primary Examiner*—Edward H. Tso
(74) *Attorney, Agent, or Firm*—Garvey, Smith, Nehrbass & Doody, L.L.C.; Seth M. Nehrbass

(57) ABSTRACT

A system and method for transferring power does not require direct electrical conductive contacts. There is provided a primary unit having a power supply and a substantially laminar surface having at least one conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area; and at least one secondary device including at least one conductor that may be wound about a core; wherein the active area has a perimeter large enough to surround the conductor or core of the at least one secondary device in any orientation thereof substantially parallel to the surface of the primary unit in the active area, such that when the at least one secondary device is placed on or in proximity to the active area in a predetermined orientation, the electromagnetic field induces a current in the at least one conductor of the at least one secondary device.

41 Claims, 20 Drawing Sheets

U.S. PATENT DOCUMENTS

| | | | |
|---|---|---|---|
| 4,714,925 A | 12/1987 | Bartlett | |
| 4,836,344 A | 6/1989 | Bolger | |
| 4,873,677 A | 10/1989 | Sakamoto et al. | |
| 4,912,391 A | 3/1990 | Meadows | 320/108 |
| 5,229,652 A | 7/1993 | Hough | |
| 5,264,776 A | 11/1993 | Hulsey | 320/108 |
| 5,293,308 A | 3/1994 | Boys et al. | |
| 5,323,099 A | 6/1994 | Bruni et al. | 311/109 |
| 5,428,961 A | 7/1995 | Sakakibara et al. | |
| 5,455,466 A | 10/1995 | Parks et al. | 307/104 |
| 5,519,262 A | 5/1996 | Wood | |
| 5,528,113 A | 6/1996 | Boys et al. | 318/16 |
| 5,536,979 A | 7/1996 | McEachern et al. | |
| 5,550,452 A | 8/1996 | Shirai et al. | 320/108 |
| 5,567,537 A * | 10/1996 | Yoshizawa et al. | 428/692 |
| 5,568,036 A | 10/1996 | Hulsey et al. | 320/108 |
| 5,594,317 A | 1/1997 | Yeow et al. | 340/15.26 |
| 5,734,254 A | 3/1998 | Stephens | 320/106 |
| 5,949,155 A | 9/1999 | Tamura et al. | 307/107 |
| 5,959,433 A * | 9/1999 | Rohde | 320/108 |
| 6,005,304 A | 12/1999 | Seelig | |
| 6,008,622 A | 12/1999 | Nakawatase | 320/108 |
| 6,016,046 A | 1/2000 | Kaite et al. | 320/108 |
| 6,040,680 A | 3/2000 | Toya et al. | |
| 6,057,668 A | 5/2000 | Chao | 320/108 |
| 6,100,663 A | 8/2000 | Boys et al. | |
| 6,175,461 B1 | 1/2001 | Fukuda et al. | |
| 6,208,115 B1 | 3/2001 | Binder | 320/108 |
| 6,288,519 B1 | 9/2001 | Peele | |
| 6,316,909 B1 | 11/2001 | Honda et al. | |
| 6,331,744 B1 | 12/2001 | Chen et al. | 320/172 |
| 6,388,548 B1 | 5/2002 | Saito et al. | |
| 6,489,745 B1 * | 12/2002 | Koreis | 320/108 |
| 6,498,455 B2 | 12/2002 | Zink et al. | 310/108 |
| 6,498,456 B2 * | 12/2002 | Ettes et al. | 320/108 |
| 6,633,155 B1 | 10/2003 | Liang | |
| 6,650,213 B1 | 11/2003 | Sakurai et al. | |
| 2003/0030342 A1 | 2/2003 | Chen et al. | |
| 2003/0048254 A1 | 3/2003 | Huang | |
| 2003/0103039 A1 | 6/2003 | Burr et al. | 345/163 |
| 2004/0005915 A1 | 1/2004 | Hunter | |

FOREIGN PATENT DOCUMENTS

| | | |
|---|---|---|
| EP | 0800182 A1 | 10/1997 |
| FR | 2695285 A3 | 3/1994 |
| GB | 2008869 A | 6/1979 |
| GB | 2142480 | 1/1985 |
| GB | 2314470 A | 12/1997 |
| GB | 2330461 A | 1/1999 |
| GB | 2389720 | 12/2003 |
| JP | 05-234763 A | 9/1993 |
| JP | 07037737 | 2/1995 |
| JP | 07298505 | 11/1995 |
| JP | 0926121 | 10/1997 |
| JP | 11-95922 A | 4/1999 |
| JP | 11-98704 | 4/1999 |
| JP | 11307376 | 11/1999 |
| JP | 2000269058 | 9/2000 |
| JP | 2001190029 | 7/2001 |
| SE | 8704910 | 12/1987 |
| WO | WO 94/28560 | 12/1994 |
| WO | WO 95/11544 | 4/1995 |
| WO | WO 95/11545 A1 | 4/1995 |
| WO | WO 97/42695 A1 | 11/1997 |
| WO | WO 98/31073 A2 | 7/1998 |
| WO | WO 00/61400 A1 | 10/2000 |
| WO | WO-0116995 | 3/2001 |
| WO | WO 01/27946 A1 | 4/2001 |

OTHER PUBLICATIONS

K. Hatanaka, et al., Excited Composition of Primary Side in a Position–Free Contactless Power Station System, Jan. 17, 2002, pp. 580–584, vol. 26, No. 4, JAPAN.

K. Hatanaka, et al., Power Transmission of a Desk With a Cord–Free Power Supply, Sep. 1, 2002, IEEE Transactions on Magnets, pp. 3329–3331, vol. 38, No. 5.

Arnold fixed my mousepad charger!! http://www.afrotech-mods.com/cheap/arnoldpad/arnoldpad.htm, Jun. 17, 2003.

* cited by examiner

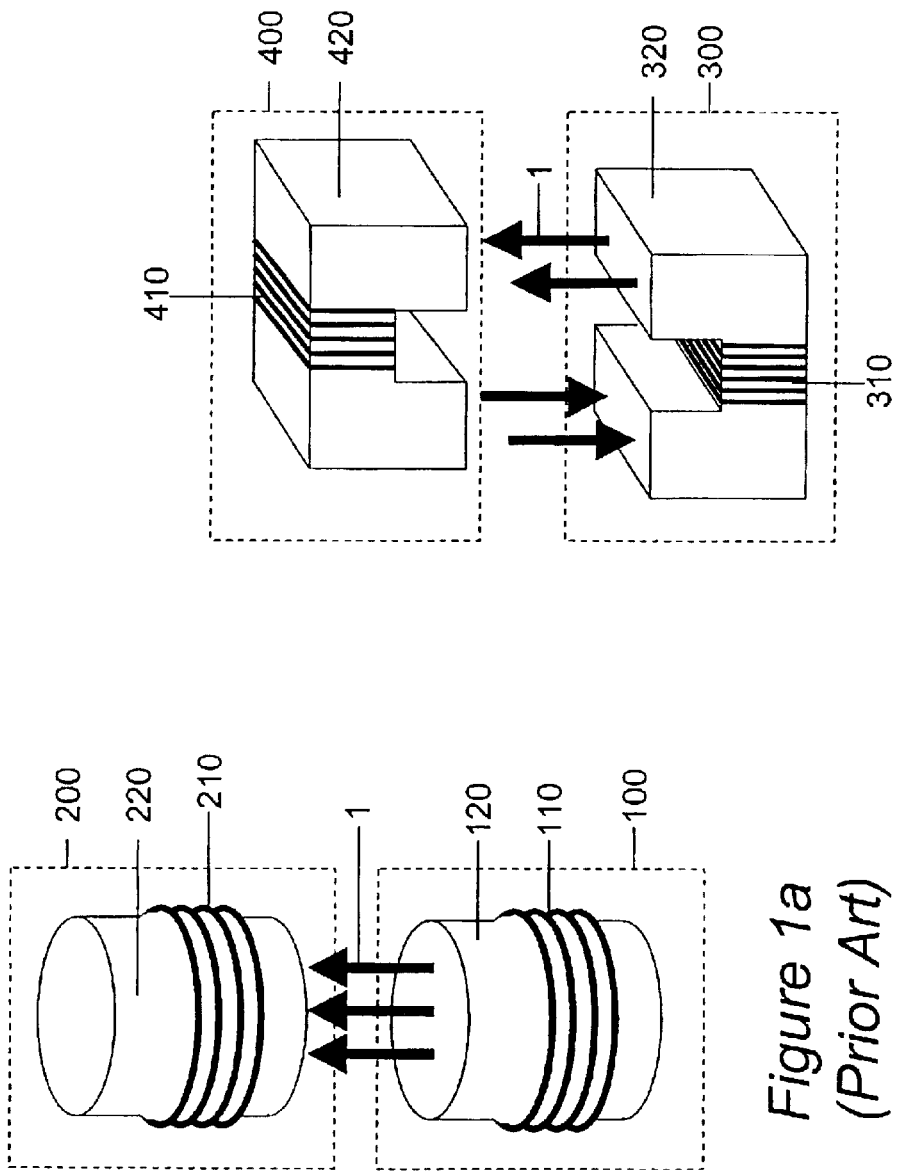

x =5mm

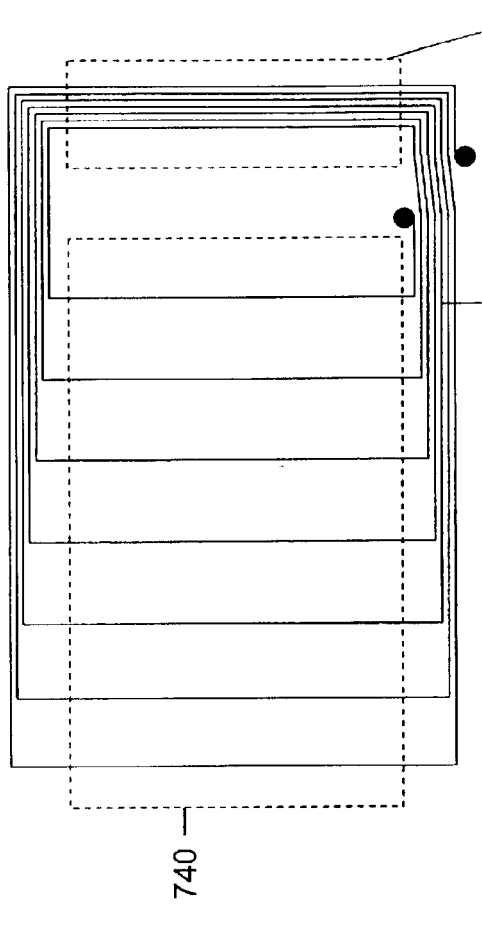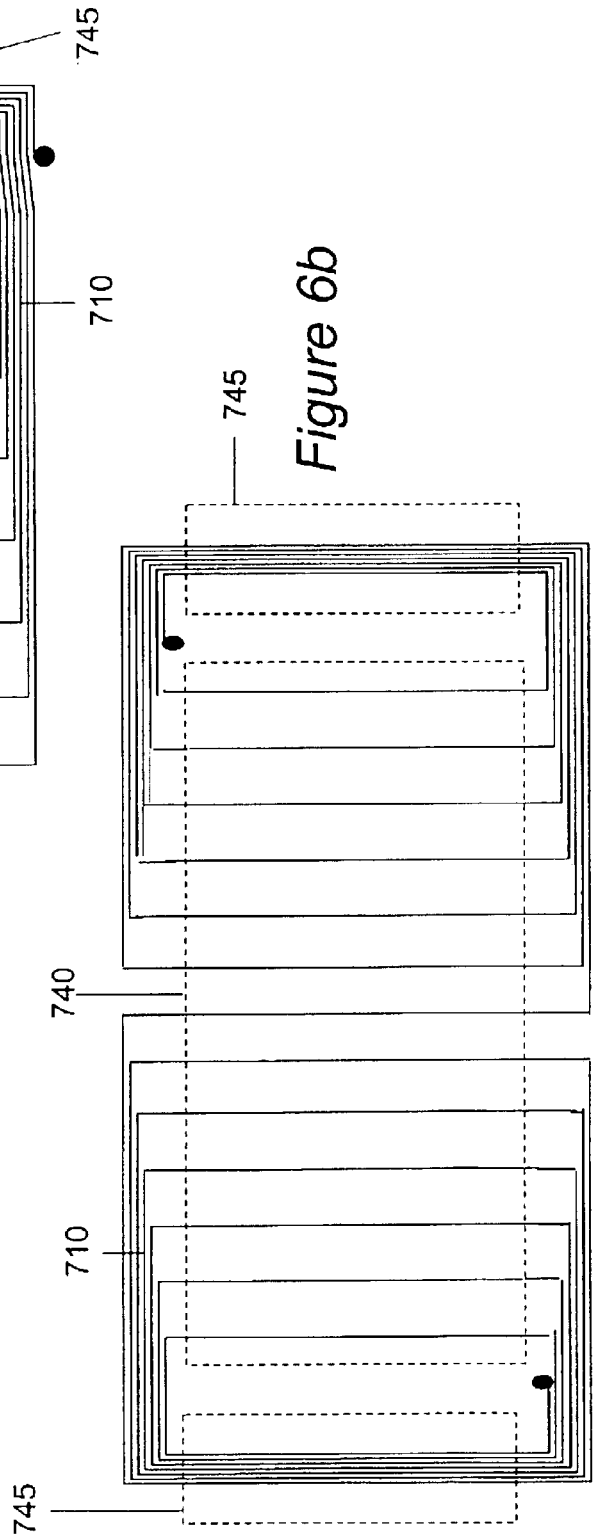

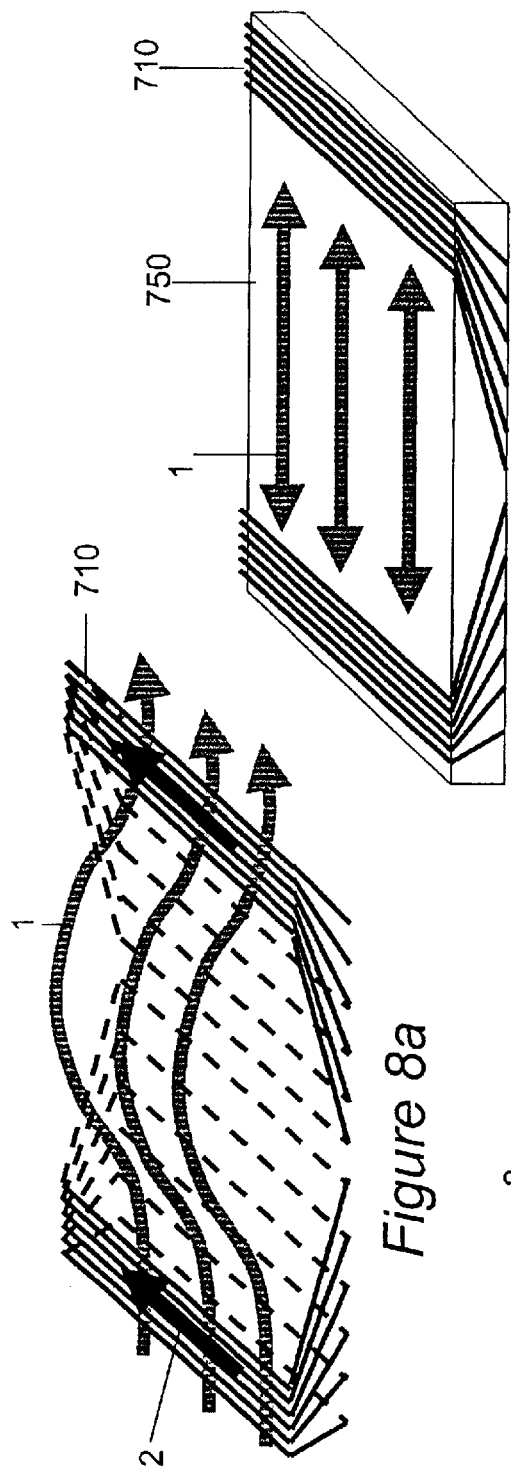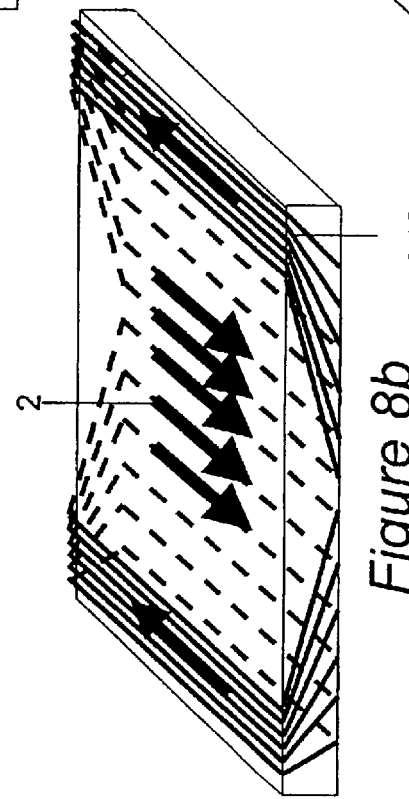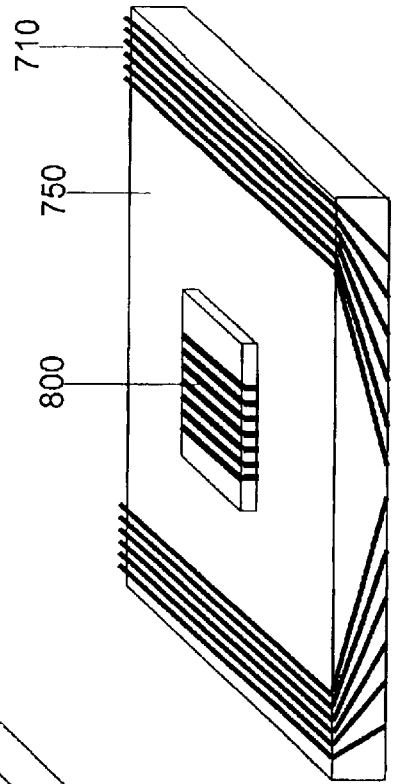

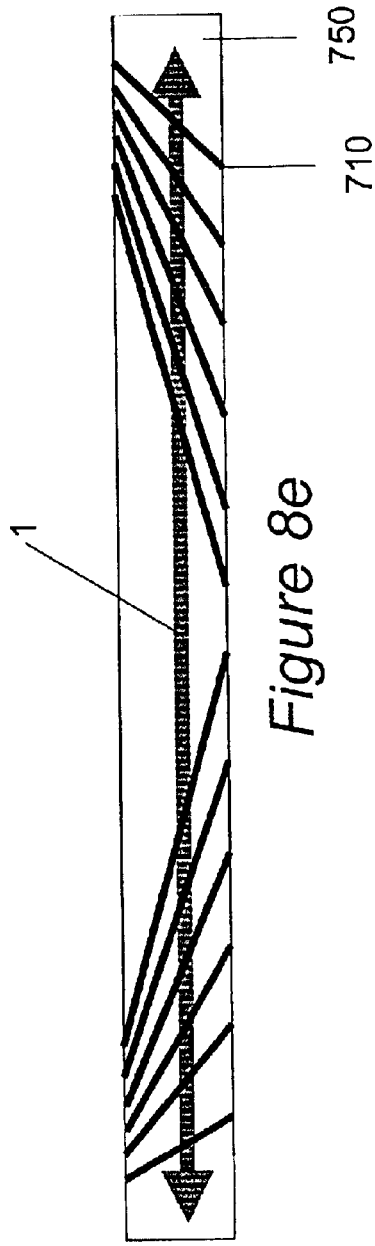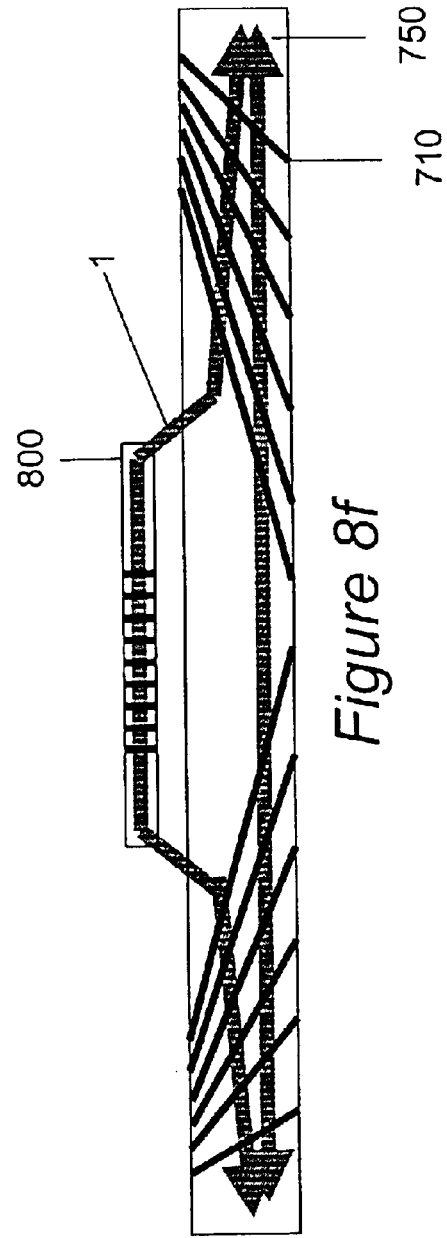

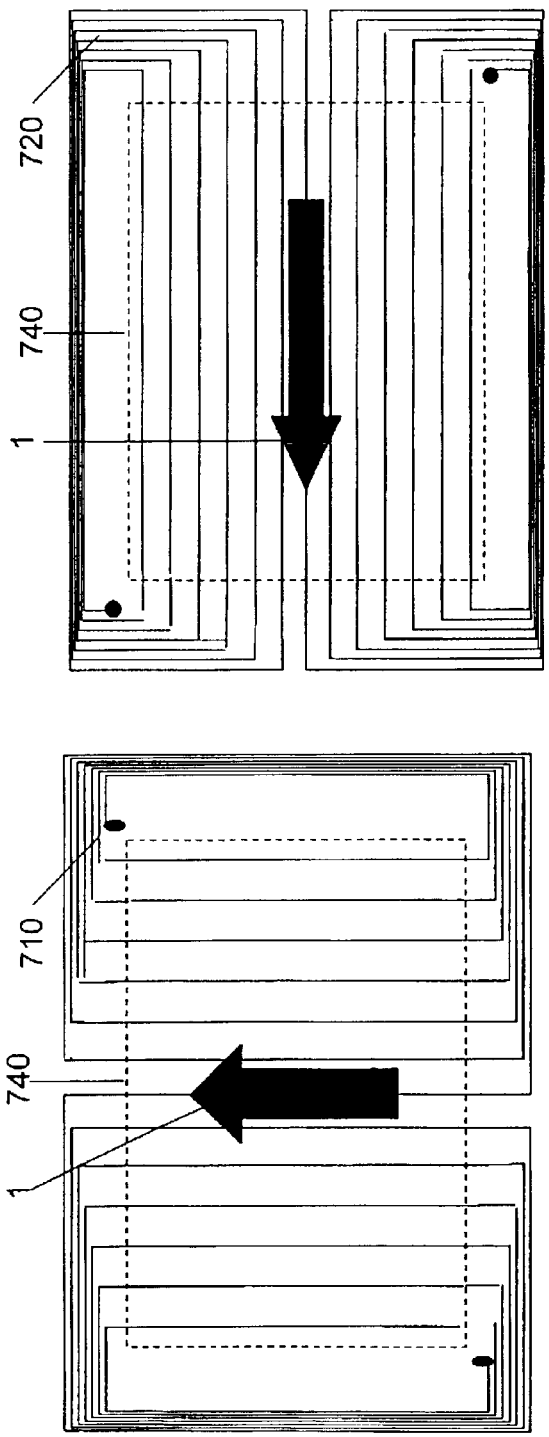
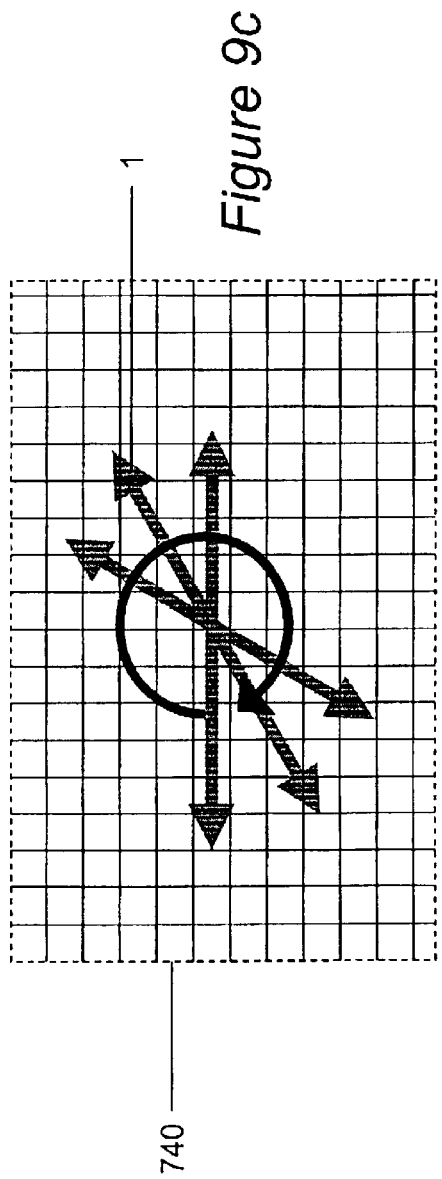
Figure 9b
Figure 9c
Figure 9a

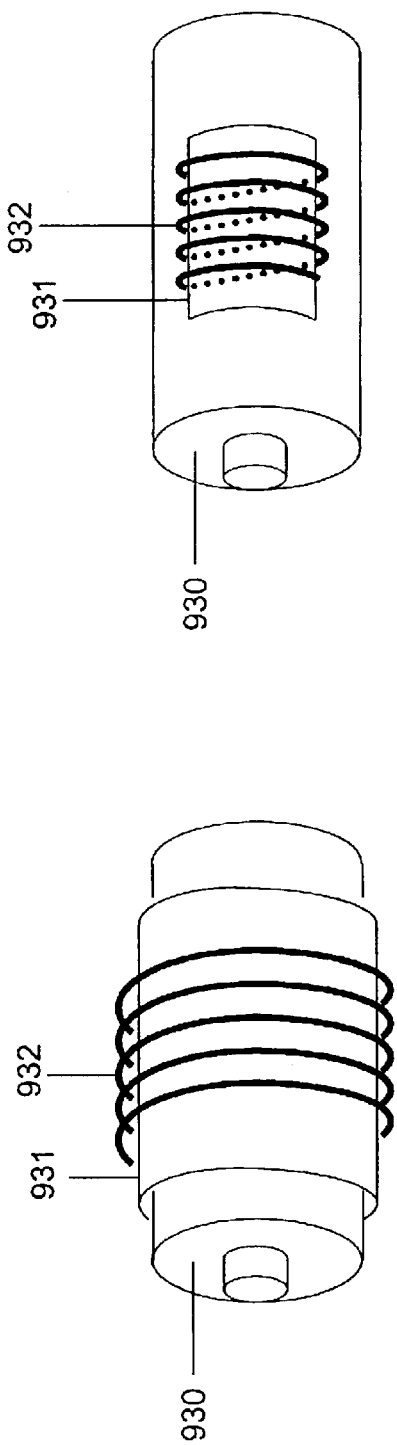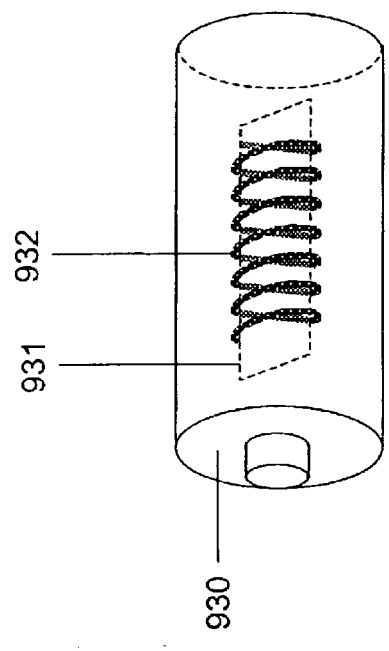
Figure 11a
Figure 11b
Figure 11c

CONTACT-LESS POWER TRANSFER

CROSS-REFERENCE TO RELATED APPLICATIONS

The present application claims convention priority from UK patent applications numbers 0210886.8 filed on 13th May 2002, 0213024.3 filed on 7th Jun. 2002 and 0228425.5 filed on 6th Dec. 2002, all of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention relates to a new device and method for transferring power in a contact-less fashion.

2. General Background of the Invention

Many of today's portable devices incorporate "secondary" power cells which can be recharged, saving the user the cost and inconvenience of regularly having to purchase new cells. Example devices include cellular telephones, laptop computers, the Palm 500 series of Personal Digital Assistants, electric shavers and electric toothbrushes. In some of these devices, it is possible to charge the cells via inductive coupling rather than direct electrical connection. Examples include the Braun Oral B Plak Control power toothbrush, the Panasonic Digital Cordless Phone Solution KX-PH15AL and the Panasonic multi-head men's shavers ES70/40 series.

Each of these devices typically has an adaptor or charger which takes power from mains electricity, a car cigarette lighter or other sources of power and converts it into a form suitable for charging the secondary cells. There are a number of problems associated with conventional means of powering or charging these devices:

Both the characteristics of the cells within each device and the means of connecting to them vary considerably from manufacturer to manufacturer, and from device to device. Therefore users who own several such devices must also own several different adaptors. If users are going away on travel, they will have to bring their collection of chargers if they expect to use their devices during this time.

These adaptors and chargers often require users to plug a connector into the device or to place the device into a stand causing inconvenience. If users fail to plug or place their device into a charger and it runs out of power, the device becomes useless and important data stored locally in the device might even be lost.

In addition, most adaptors and chargers have to be plugged into mains sockets and hence if several are used together, they take up space in plug strips and create a messy and confusing tangle of wires.

Besides the above problems with conventional methods of recharging devices, there are also practical problems associated with devices having an open electrical contact. For example, devices cannot be used in wet environments due to the possibility of corroding or shorting out the contacts and also they cannot be used in flammable gaseous environments due to the possibility of creating electrical sparks.

Chargers which use inductive charging remove the need to have open electrical contacts hence allowing the adaptor and device to be sealed and used in wet environments (for example the electric toothbrush as mentioned above is designed to be used in a bathroom). However such chargers still suffer from all other problems as described above. For example, the devices still need to be placed accurately into a charger such that the device and the charger are in a predefined relative position (See FIGS. 1a and 1b). The adaptors are still only designed specifically for a certain make and model of device and are still only capable of charging one device at a time. As a result, users still need to possess and manage a collection of different adaptors.

Universal chargers (such as the Maha MH-C777 Plus Universal charger) also exist such that battery packs of different shapes and characteristics can be removed from the device and charged using a single device. Whilst these universal chargers eliminate the need for having different chargers for different devices, they create even more inconvenience for the user in the sense that the battery packs first need to be removed, then the charger needs to be adjusted and the battery pack needs to be accurately positioned in or relative to the charger. In addition, time must be spent to determine the correct pair of battery pack metal contacts which the charger must use.

It is also known that patent U.S. Pat. No. 5,959,433: "Universal Inductive Battery Charger System" describes a non-contact battery charging system. The battery charger described includes a single charging coil which creates magnetic flux lines which will induce an electrical current in a battery pack which may belong to cellular phones or laptop computers.

It is also known that patent U.S. Pat. No. 4,873,677: "Charging Apparatus for an Electronic Device" describes an apparatus for charging an electronic device which includes a pair of coils. This pair of coils is designed to operate in anti-phase such that magnetic flux lines are coupled from one coil to the other. An electronic device such as a watch can be placed on these two coils to receive power.

It is also known that patent U.S. Pat. No. 5,952,814: "Induction charging apparatus and an electronic device" describes an induction charger for charging a rechargeable battery. The shape of the external casing of the electronic device matches the internal shape of the charger thus allowing for accurate alignment of the primary and secondary coils.

It is also known that patent U.S. Pat. No. 6,208,115: "Battery substitute pack" discloses a substitute battery pack which may be inductively recharged.

It is known that patent WO00/61400: "Device for Inductively Transmitting Electrical Power" discloses a means of transferring power inductively to conveyors.

It is known that patent WO9511545 "Inductive power pick-up coils" outlines a system for inductive powering of electric vehicles from a series of in-road flat primaries.

To overcome the limitations of inductive power transfer systems which require that secondary devices be axially aligned with the primary unit, one might propose that an obvious solution is to use a simple inductive power transfer system whereby the primary unit is capable of emitting an electromagnetic field over a large area (See FIG. 2a). Users can simply place one or more devices to be recharged within range of the primary unit, with no requirement to place them accurately. For example this primary unit may consist of a coil encircling a large area. When a current flows through the coil, a large electromagnetic field is created and devices can be placed anywhere within this area. Although theoretically feasible, this method suffers from a number of drawbacks. Firstly, the intensity of electromagnetic emissions is governed by regulatory limits. This means that this method can only support power transfer at a low rate. In addition, there are many objects that can be affected by the presence of a large magnetic field. For example, data stored on credit cards maybe destroyed and objects made of metal will have induced therein eddy currents generating undesired heating effects.

To avoid the generation of large magnetic fields, one might suggest using an array of coils (See FIG. 3) whereby only the coils needed are activated. This method is described in a paper published in the Journal of the Magnetics Society of Japan titled "Coil Shape in a Desk-type Contactless Power Station System" ($29^{th}$ Nov. 2001). In an embodiment of the multiple-coil concept, a sensing mechanism senses the relative location of the secondary device relative to the primary unit. A control system then activates the appropriate coils to deliver power to the secondary device in a localised fashion. Although this method provides a solution to the problems previously listed, it does so in a complicated and costly way. The degree to which the primary field can be localised is limited by the number of coils and hence the number of driving circuits used (i.e. the "resolution" of the primary unit). The cost associated a multiple-coil system would severely limit the commercial applications of this concept. Non-uniform field distribution is also a drawback. When all the coils are activated in the primary unit, they sum to an equivalent of a large coil, the magnetic field distribution of which is seen to exhibit a minimum at the centre of the coil.

None of the prior art solutions can satisfactorily address all of the problems that have been described. It would be convenient to have a solution which is capable of transferring power to portable devices with all of the following features and is cost effective to implement:

Universality: a single primary unit which can supply power to different secondary devices with different power requirements thereby eliminating the need for a collection of different adaptors and chargers;

Convenience: a single primary unit which allows secondary devices to be placed anywhere within an active vicinity thereby eliminating the need for plugging-in or placing secondary devices accurately relative to an adaptor or charger;

Multiple-load: a single primary unit that can supply power to a number of secondary different devices with different power requirements at the same time;

Flexibility for use in different environments: a single primary unit that can supply power to secondary devices such that no direct electrical contact is required thereby allowing for secondary devices and the primary unit itself to be used in wet, gaseous, clean and other a typical environments Low electromagnetic emissions: a primary unit that can deliver power in a manner that will minimize the intensity and size of the magnetic field generated It is further to be appreciated that portable appliances are proliferating and they all need batteries to power them. Primary cells, or batteries of them, must be disposed of once used, which is expensive and environmentally unfriendly. Secondary cells or batteries can be recharged and used again and again.

Many portable devices have receptacles for cells of an industry-standard size and voltage, such as AA, AAA, C, D and PP3. This leaves the user free to choose whether to use primary or secondary cells, and of various types. Once depleted, secondary cells must typically be removed from the device and placed into a separate recharging unit. Alternatively, some portable devices do have recharging circuitry built-in, allowing cells to be recharged in-situ once the device is plugged-in to an external source of power.

It is inconvenient for the user to have to either remove cells from the device for recharging, or to have to plug the device into an external power source for recharging in-situ. It would be far preferable to be able to recharge the cells without doing either, by some non-contact means.

Some portable devices are capable of receiving power coupled inductively from a recharger, for example the Braun Oral B Plak Control toothbrush. Such portable devices typically have a custom, dedicated power-receiving module built-in to the device, which then interfaces with an internal standard cell or battery (which may or may not be removable).

However it would be convenient if the user could transform any portable device which accepts industry-standard cell sizes into an inductively-rechargeable device, simply by fitting inductively-rechargeable cells or batteries, which could then be recharged in-situ by placing the device onto an inductive recharger.

Examples of prior art include U.S. Pat. No. 6,208,115, which discloses a substitute battery pack which may be inductively recharged.

All references mentioned herein are incorporated herein by reference.

BRIEF SUMMARY OF THE INVENTION

According to a first aspect of the present invention, there is provided a system for transferring power without requiring direct electrical conductive contacts, the system comprising:

i) a primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area; and ii) at least one secondary device including at least one electrical conductor;

wherein the active area of the primary unit has a perimeter large enough to surround the electrical conductor of the at least one secondary device in at least one orientation thereof substantially parallel to the surface of the primary unit in the active area, such that when the at least one secondary device is placed on or in proximity to the active area in a predetermined orientation, the electromagnetic field induces a current in the at least one conductor of the at least one secondary device.

According to a second aspect of the present invention, there is provided a primary unit for transferring power in a non-conductive manner to at least one secondary device including at least one electrical conductor, the primary unit having a substantially laminar surface with at least one electrical conductor that generates an electromagnetic field when a current flows therethrough and having an active area defined within a perimeter of the surface, the at least one conductor of the primary unit being arranged such that electromagnetic field lines generated by the at least one conductor of the primary unit are substantially parallel to a plane of the surface within the active area, and wherein the active area has a perimeter large enough to surround the conductor of the at least one secondary device in at least one orientation thereof substantially parallel to the surface of the primary unit in the active area.

According to a third aspect of the present invention, there is provided a method of transferring power in a non-conductive manner from a primary unit to a secondary device, the primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area, and the secondary device having at least one electrical conductor, wherein the active area has a perimeter large enough to surround the conductor of the at least one secondary device in at least one orientation thereof substantially parallel to the surface of the primary unit within the active area and wherein flux lines of the electromagnetic field link with the conductor of the secondary device when this is placed on or in proximity to the active area.

According to a fourth aspect of the present invention, there is provided a secondary device for use with the system, unit or method of the first, second or third aspects, the secondary device including at least one electrical conductor, preferably having a substantially flat form factor.

The primary unit may include an integral power supply for the electrical conductor, or may be provided with means enabling the electrical conductor to be connected to an external power supply.

The at least one electrical conductor in the secondary device may be wound about a core that serves to concentrate flux therein. In particular, the core (where provided) may offer a path of least resistance to flux lines of the electromagnetic field generated by the primary unit. The core may be amorphous magnetically permeable material. In some embodiments, there is no need for an amorphous core.

The at least one conductor in the primary unit may be a coil, for example in the form of a length of wire or a printed strip, or may be in the form of a conductive plate of appropriate configuration. A preferred material is copper, although other conductive materials may be used as appropriate. It is to be understood that the term "coil" is here intended to encompass any appropriate electrical conductor forming an electrical circuit through which current may flow and thus generate an electromagnetic field. In particular, the "coil" need not be wound about a core or former or the like, but may be a simple or complex loop or equivalent structure.

The core in the secondary device, where provided, is preferably a high magnetic permeability core. The relative permeability of this core is preferably at least 100, even more preferably at least 500, and most preferably at least 1000, with magnitudes of at least 10,000 or 100,000 being particularly advantageous.

Preferably, the active area of the primary unit is large enough to accommodate the conductor and/or core of the secondary device in a plurality of orientations thereof. In a particularly preferred embodiment, the active area is large enough to accommodate the conductor and/or core of the secondary device in any orientation thereof. In this way, power transfer from the primary unit to the secondary device may be achieved without having to align the conductor and/or core of the secondary device in any particular direction when placing the secondary device on the surface of the primary unit.

The substantially laminar surface of the primary unit may be substantially planar, or may be curved or otherwise configured to fit into a predetermined space, such as a glove compartment of a car dashboard or the like.

The secondary device may adopt a substantially flat form factor with a core thickness of 2 mm or less. Using a material such as one or more amorphous metal sheets, it is possible to have core thickness down to 1 mm or less for applications where size and weight is important. See FIG. 7a.

In a preferred embodiment, the primary unit may include a pair of conductors having adjacent coplanar windings which have mutually substantially parallel linear sections arranged so as to produce a substantially uniform electromagnetic field extending generally parallel to the plane of the windings but substantially at right angles to the parallel sections.

The windings in this embodiment may be formed in a generally spiral shape, comprising a series of turns having substantially parallel straight sections.

Advantageously, the primary unit may include first and second pairs of conductors which are superimposed in substantially parallel planes with the substantially parallel linear sections of the first pair arranged generally at right angles to the substantially parallel linear sections of the second pair, and further comprising a driving circuit which is arranged to drive them in such a way as to generate a resultant field which rotates in a plane substantially parallel to the planes of the windings.

According to a fifth aspect of the present invention, there is provided a system for transferring power in a contact-less manner consisting of:

a primary unit consisting of at least one electrical coil whereby each coil features at least one active area whereby two or more conductors are substantially distributed over this area in such a fashion that it is possible for a secondary device to be placed in proximity to a part of this active area where the net instantaneous current flow in a particular direction is substantially non-zero;

at least one secondary device consisting of conductors wound around a high permeability core in such a fashion that it is possible for it to be placed in proximity to an area of the surface of the primary unit where the net instantaneous current flow is substantially non-zero;

whereby the at least one secondary device is capable of receiving power by means of electromagnetic induction when the central axis of the winding is in proximity to the active area of the primary unit, is substantially not perpendicular to the plane of the active area of primary unit and is substantially not parallel to the conductors in the active area of at least one of the coils of the primary unit.

Where the secondary device comprises an inductively rechargeable battery or cell, the battery or cell may have a primary axis and be capable of being recharged by an alternating field flowing in the primary axis of the battery or cell, the battery or cell consisting of:

an enclosure and external electrical connections similar in dimensions to industry-standard batteries or cells an energy-storage means an optional flux-concentrating means a power-receiving means a means of converting the received power to a form suitable for delivery to outside the cell through the external electrical connections, or to recharge the energy storage means, or both.

The proposed invention is a significant departure from the design of conventional inductive power transfer systems. The difference between conventional systems and the proposed system is best illustrated by looking at their respective magnetic flux line patterns. (See FIGS. 2a and 4a–4d)

Conventional System: In a conventional system (See FIG. 2a), there is typically a planar primary coil which generates a magnetic field with flux lines coming out of the plane in a perpendicular fashion. The secondary device has typically a round or square coil that encircles some or all of these flux lines.

Proposed system: In the proposed system, the magnetic field travels horizontally across the surface of the plane (see FIGS. 4a–4d) instead of directly out of the plane as illustrated in FIG. 2a. The secondary device hence may have an elongated winding wound around a magnetic core. See FIGS. 7a and 7b. When the secondary device is placed on the primary unit, the flux lines would be attracted to travel through the magnetic core of the secondary device because it is the lowest reluctance path. This causes the secondary device and the primary unit to be coupled effectively. The secondary core and winding maybe substantially flattened to form a very thin component.

In describing the invention, specific terminology will be resorted to for the sake of clarity. However, it is not intended that the invention be limited to the specific terms so selected and it is to be understood that each specific term includes all technical equivalents which operate in a similar manner to accomplish a similar purpose.

It is to be understood that the term "active area" used in this patent refers to the area of the at least one primary conductor (e.g. in the form of a coil) or an area formed by a combination of primary conductors where the secondary device can couple flux effectively. Some embodiments of this are shown in FIGS. 6a to 6e and 9c as component 740. A feature of an "active area" is a distribution of conductors over a significant area of the primary unit configured such that it is possible for the at least one primary conductor to be driven to achieve an instantaneous net flow of flux in one direction. A primary unit may have more than one active area. One active area is distinct from another active area when flux cannot be effectively coupled by the secondary device (shown in FIG. 7a) in any rotation at the boundary.

It is to be understood that the term "coil" used in this patent refers to all conductor configurations which feature an active area as described above. This includes windings of wire or printed tracks or a planes as shown in FIG. 8e. The conductors may be made of copper, gold, alloys or any other appropriate material.

This patent refers to the rotation of a secondary device in several places. It is to be clarified here that if a secondary device is rotated, the axis of rotation being referred to is the one perpendicular to the plane of the active area.

This radical change in design overcomes a number of drawbacks of conventional systems. The benefits of the proposed invention include:

No need for accurate alignment: The secondary device can be placed anywhere on the active area of the primary unit;

Uniform coupling: In the proposed invention, the coupling between the primary unit and secondary device is much more uniform over the active area compared to a conventional primary and secondary coil. In a conventional large coil system (see FIG. 2a), the field strength dips to a minimum at the centre of the coil, in the plane of the coil. This implies that if sufficient power is to be effectively transferred at the centre, the field strength at the minimum has to be above a certain threshold. The field strength at the maximum will then be excessively higher than the required threshold and this may cause undesirable effects.

Universality: a number of different secondary devices can be placed anywhere on the primary unit to receive power simultaneously;

Increased coupling coefficiency: Optional high permeability magnetic material present in the secondary device increases the induced flux significantly by offering a low reluctance path. This can significantly increase the power transfer.

Desirable form factor for secondary device: The geometry of the system allows thin sheets of magnetic material (such as amorphous metal ribbons) to be used. This means that secondary devices can have the form factor of a thin sheet, making it suitable to be incorporated at the back of mobile phones and other electronic devices. If magnetic material was to be used in the centre of conventional coils, it is likely to increase the bulkiness of whole system.

Minimised field leakage: When one or more secondary devices are present in the active area of the primary unit, it is possible to use magnetic material in such a way that more than half of the magnetic circuit is low reluctance magnetic material (see FIG. 4d). This means that more flux flows for a given magneto-motive force (mmf). As the induced voltage is proportional to the rate of change of flux linked, this will increase the power transfer to the secondary device. The fewer and shorter the air gaps are in the magnetic circuit, the less the field will fringe, the closer the flux is kept to the surface of the primary unit and hence leakage is minimized.

Cost effectiveness: Unlike the multiple-coil design, this solution requires a much simpler control system and fewer components.

Free axial rotation of secondary device: If the secondary device is thin or optionally even cylindrical (see FIG. 10), it may be constructed such that it continues to couple well to the flux regardless of its rotation about its longest axis. This may in particular be an advantage if the secondary device is a battery cell fitted within another device, when its axial rotation may be difficult to control.

The primary unit typically consists of the following components. (See FIG. 5)

Power supply: This power supply converts mains voltage into a lower voltage dc supply. This is typically a conventional transformer or a switch-mode power supply;

Control unit: The control unit serves the function of maintaining the resonance of the circuit given that the inductance of the magnetic component changes with the presence of secondary devices. To enable this function, the control unit may be coupled to a sensing unit which feeds back the current status of the circuit. It may also be coupled to a library of capacitors which may be switched in and out as required. If the magnetic unit requires more than one driving circuit, the control unit may also coordinate the parameters such as the phase difference or on/off times of different driving circuits such that the desired effect is achieved. It is also possible for the Q (quality factor) of the system to be designed to function over a range of inductances such that a need the above control system is eliminated;

Driving circuit: The driving unit is controlled by the control unit and drives a changing current through the magnetic unit or a component of the magnetic unit. More than one driving circuit may be present depending on the number of independent components in the magnetic unit;

Magnetic unit: The magnetic unit uses current supplied from the driving circuits to generate magnetic fields of pre-defined shapes and intensities. The exact configuration of the magnetic unit defines the shape and intensity of the field generated. The magnetic unit is likely to consist of magnetic material to act as flux guides and also one or more independently driven components (windings), together forming the active area. A number of embodiment designs are possible and this is shown in FIGS. 6a–6f.

Sensing unit: The sensing unit retrieves and sends relevant data to the control unit for interpretation.

The secondary device typically consists of the following components, as shown in FIG. 5.

Magnetic unit: the magnetic unit converts the energy stored in the magnetic field generated by the primary unit back into electrical energy. This is typically implemented by means of a winding wound around a highly permeable magnetic core. The largest dimension of the core typically coincides with the central axis of the winding.

Conversion unit: the conversion unit converts the fluctuating current received from the magnetic unit into a form that is useful to the device that it is coupled to. For example, the conversion unit may convert the fluctuating current into an unregulated dc supply by means of a full-wave bridge rectifier and smoothing capacitor. In other cases, the conversion unit may be coupled to a heating element or a battery charger. There is also typically a capacitor present either in parallel or in series with the magnetic unit to form a resonant circuit at the operating frequency of the primary unit.

In typical operation, one or more secondary devices are placed on top of the active area of the primary unit. The flux flows through the at least one conductor and/or core of the secondary devices present and current is induced. Depending on the configuration of the primary magnetic unit, the rotation of the secondary device may affect the amount of flux coupled.

The Primary Unit

The primary unit may exist in many different forms, for example:

As a flat platform which can sit on top of tables and other flat surfaces;

Built in to furniture such as desks, tables, counters, chairs such that the primary unit may not be visible;

As part of an enclosure such as a drawer, a box, a glove compartment of a car, the container of power tools;

As a flat platform which can be attached to a wall and used vertically;

The primary unit may be powered from different sources, for example:

A mains AC power outlet

A vehicle lighter socket

Batteries

Fuel Cells

Solar Panel

Human power

The primary unit may be small enough such that only one secondary device may be accommodated within the active area, or may be large enough to accommodate many secondary devices simultaneously.

The magnetic unit of the primary unit may be driven at mains frequency (50 Hz or 60 Hz) or at some higher frequency.

The sensing unit of the primary unit may sense the presence of secondary devices, the number of secondary devices present and even the presence of other magnetic material which is not part of a secondary device. This information may be used to control the current being delivered to the magnetic unit of the primary unit.

The primary unit and/or the secondary device may be substantially waterproof or explosion proof.

The primary unit and/or the secondary device may be hermetically sealed to standards such as IP66.

The primary unit may incorporate visual indicators (for example, but not limited to, light emitting devices, such as light emitting diodes, electrophosphorescent displays, light emitting polymers, or light reflecting devices, such as liquid crystal displays or MITs electronic paper) to indicate the current state of the primary unit, the presence of secondary devices or the number of secondary devices present or any combination of the above.

The Primary Conductor

The primary conductor as referred to in this invention includes all configurations of conductors where:

The conductors are substantially distributed in the plane and;

Substantial areas of the plane exist where there is a non-zero net instantaneous current flow. These are areas on which, given the correct orientation, the secondary devices will couple effectively and receive power. (See FIGS. 6a–6f)

The conductors are capable of generating an electromagnetic field where the field lines are substantially parallel to a substantial area of the plane.

FIGS. 6a–6f illustrate some possibilities for such a primary conductor. Although most of the configurations are in fact coil windings, it is to be appreciated that the same effect can also be achieved with conductor planes which are not typically considered to be coils (See FIG. 6e). These drawings are typical examples and are non-exhaustive. These conductors or coils may be used in combination such that the secondary device can couple effectively in all rotations whilst on the active area of the primary unit.

Magnetic Material

It is possible to use magnetic materials in the primary unit to enhance performance.

Magnetic material may be placed below the active area such that there is also a low reluctance path on the underside of the conductors for the flux to complete its path. According to theory, an analogy can be drawn between magnetic circuits and electrical circuits. Voltage is analogous to magneto-motive force (mmf), resistance is analogous to reluctance and current is analogous to flux. From this, it can be seen that for a given mmf, flux flow will increase if the reluctance of the path is decreased. By providing magnetic material to the underside of the active area, we are essentially decreasing the reluctance of the magnetic circuit. This substantially increases the flux linked by the secondary device and ultimately increases the power transferred. FIG. 4d illustrates a sheet of magnetic material placed underneath the active area and the resulting magnetic circuit.

Magnetic material may also be placed above the active area and below the secondary devices to act as a flux guide. This flux guide performs two functions: Firstly, it decreases the reluctance of the whole magnetic circuit is further decreased allowing more flux will flow. Secondly, it provides a low reluctance path along the top surface of the active area so the flux lines will flow through these flux guides in favour of flowing through the air. Hence this has the effect of containing the field close to the surface of the primary unit instead of in the air. The magnetic material used for flux guides may be strategically chosen to have different magnetic properties to the magnetic core (where provided) of the secondary device. For example, a material with lower permeability and higher saturation may be chosen. High saturation means that the material can carry more flux and the lower permeability means that when a secondary device is in proximity, a significant amount of flux would then choose to travel through the secondary device in favour of the flux guide. (See FIGS. 8a–8f)

In some primary magnetic unit configurations, there may be conductors present that do not form part of the active power transfer area, such as the component marked 745 in FIGS. 6a and 6b. In such cases, one may wish to use magnetic material to shield the effects of these conductors.

Examples of some materials which may be used include but is not limited to: amorphous metal (metallic glass alloys such as MetGlas™), mesh of wires made of magnetic material, steel, ferrite cores, mumetal.

The Secondary Device

The secondary device may take a variety of shapes and forms. Generally, in order for good flux linkage, a central axis of the conductor (for example, a coil winding) should be substantially non-perpendicular to the active area.

The secondary device may be in the shape of a flattened winding. (See FIG. 7a) The magnetic core inside can consist of sheets of magnetic material such as amorphous metals. This geometry allows the secondary device to be incorporated at the back of electronic devices such as mobile phones, personal digital assistants and laptops without adding bulk to the device.

The secondary device may be in the shape of a long cylinder. A long cylindrical core could be wound with conductors (See FIG. 7b).

The secondary device may be a standard-sized (AA, AAA, C, D) or other sized (e.g. dedicated/customised for particular applications) rechargeable battery cell with for example magnetic material wrapped around the cylinder and windings around the cylindrical body.

The secondary device may be a combination of two or more of the above. The above embodiments may even be combined with a conventional coil The following non-exhaustive list illustrates some examples of objects that can be coupled to a secondary device to receive power. Possibilities are not limited to those described below:

A mobile communication device, for example a radio, mobile telephone or walkie-talkie;

A portable computing device, for example a personal digital assistant or palmtop or laptop computer;

Portable entertainment devices, for example a music player, game console or toy;

Personal care items, for example a toothbrush, shaver, hair curler, hair rollers;

A portable imaging device, for example video recorder or camera;

Containers of contents that may require heating, for example coffee mugs, plates, cooking pots, nail-polish and cosmetic containers;

Consumer devices, for example torches, clocks and fans;

A battery-pack for insertion into any of the above;

A standard-sized battery cell;

In the case of unintelligent secondary devices such as a battery cell, some sophisticated charge-control means may also be necessary to meter inductive power to the cell and to deal with situations where multiple cells in a device have different charge states. Furthermore, it becomes more important for the primary unit to be able to indicate a "charged" condition, since the secondary cell or battery may not be easily visible when located inside another electrical device.

A possible system incorporating an inductively rechargeable battery or cell is shown in FIG. 10. In addition to the freedom to place the battery 920 freely in (X,Y) and optionally rotate it in rZ, relative to the primary unit 910, the battery can also be rotated along its axis rA while continuing to receive power.

When a user inserts a battery into a portable device, it is not easy to ensure that it has any given axial rotation. Therefore, embodiments of the present invention are highly advantageous because they can ensure that the battery can receive power while in any random orientation about rA.

The battery or cell may include a flux concentrating means that may be arranged in a variety of ways:

1. As shown in FIG. 11a, a cell 930 may be wrapped in a cylinder of flux-concentrating material 931, around which is wrapped a coil of wire 932.
   a. The cylinder may be long or short relative to the length of the cell.
2. As shown in FIG. 11b, a cell 930 may have a portion of flux-concentrating material 931 on its surface, around which is wrapped a coil of wire 932.
   a. The portion may be conformed to the surface of the cell, or embedded within it.
   b. Its area may be large or small relative to the circumference of the cell, and long or short relative to the length of the cell.
3. As shown in FIG. 11c, a cell 930 may contain a portion of flux-concentrating material 931 within it, around which is wrapped a coil of wire 932.
   a. The portion may be substantially flat, cylindrical, rod-like, or any other shape.
   b. Its width may be large or small relative to the diameter of the cell
   c. Its length may be large or small relative to the length of the cell In any of these cases, the flux-concentrator may be a functional part of the battery enclosure (for example, an outer zinc electrode) or the battery itself (for example, an inner electrode).

Issues relating to charging e.g. AA cells in-situ within an appliance include:

Terminal voltage could be higher than normal.

Cells in series may behave strangely, particularly in situations where some cells are charged, others not.

Having to provide enough power to run the device and charge the cell.

If fast-charging is effected incorrectly, the cells may explode, so raising product liability issues.

Accordingly, some sophisticated charge-control means to meter inductive power to the appliance and the cell is advantageously provided. Furthermore, it becomes more important for the primary unit to be able to indicate a "charged" condition, since the secondary cell or battery may not be easily visible when located inside an electrical device.

A cell or battery enabled in this fashion may be charged whilst fitted in another device, by placing the device onto the primary unit, or whilst outside the device by placing the cell or battery directly onto the primary unit.

Batteries enabled in this fashion may be arranged in packs of cells as in typical devices (e.g. end-to-end or side-by-side), allowing a single pack to replace a set of cells.

Alternatively, the secondary device may consist of a flat "adapter" which fits over the batteries in a device, with thin electrodes which force down between the battery electrodes and the device contacts.

Rotating Magnetic Dipole

In the coils such as those in FIGS. 6a–6f, 9a, and 9b, the secondary devices will generally only couple effectively when the windings are placed substantially parallel to the direction of net current flow in the primary conductor as shown by the arrow 1. In some applications, one might require a primary unit which will transfer power effectively to secondary devices regardless of their rotation as long as:

the central axis of the secondary conductor is not perpendicular to the plane and;

the secondary device is in close proximity to the primary unit

To enable this, it is possible to have two coils, for example one positioned on top of the other or one woven into or otherwise associated with the other, the second coil capable of generating a net current flow substantially perpendicular to the direction of the first coil at any point in the active area of the primary unit. These two coils may be driven alternately such that each is activated for a certain period of time. Another possibility is to drive the two coils in quadrature such that a rotating magnetic dipole is generated in the plane. This is illustrated in FIGS. 9a–9c. This is also possible with other combinations of coil configurations.

Resonant Circuits

It is known in the art to drive coils using parallel or series resonant circuits. In series resonant circuits for example, the impedance of the coil and the capacitor are equal and opposite at resonance, hence the total impedance of the circuit is minimised and a maximum current flows through the primary coil. The secondary device is typically also tuned to the operating frequency to maximise the induced voltage or current.

In some systems like the electric toothbrush, it is common to have a circuit which is detuned when the secondary device is not present and tuned when the secondary device is in place. The magnetic material present in the secondary device shifts the self-inductance of the primary unit and brings the circuit into resonance. In other systems like passive radio tags, there is no magnetic material in the secondary device and hence does not affect the resonant frequency of the system. These tags are also typically small and used far from the primary unit such that even if magnetic material is present, the inductance of the primary is not significantly changed.

In the proposed system, this is not the case:

High permeability magnetic material may be present in the secondary device and is used in close proximity to the primary unit;

One or more secondary devices may be brought in close proximity to the primary unit simultaneously;

This has the effect of shifting the inductance of the primary significantly and also to different levels depending on the number of secondary devices present on the pad. When the inductance of the primary unit is shifted, the capacitance required for the circuit to resonant at a particular frequency also changes. There are three methods for keeping the circuit at resonance:

By means of a control system to dynamically change the operating frequency;

By means of a control system to dynamically change the capacitance such that resonance is achieved at the predefined frequency;

By means of a low Q system where the system remains in resonance over a range of inductances The problem with changing the operating frequency is that the secondary devices are typically configured to resonate at a predefined frequency. If the operating frequency changes, the secondary device would be detuned. To overcome this problem, we can change the capacitance instead of the operating frequency. The secondary devices can be designed such that each additional device placed in proximity to the primary unit will shift the inductance to a quantised level such that an appropriate capacitor can be switched in to make the circuit resonate at a predetermined frequency. Because of this shift in resonant frequency, the number of devices on the pad can be detected and the pad can also sense when something is brought near or taken away from the pad. If a magnetically permeable object other than a valid secondary device is placed in the vicinity of the pad, it is unlikely to shift the system to the predefined quantised level. In such circumstances, the system could automatically detune and reduce the current flowing into the coil.

BRIEF DESCRIPTION OF THE SEVERAL VIEWS OF THE DRAWINGS

For a better understanding of the present invention and to show how it may be carried into effect, reference shall now be made, by way of example only, to the accompanying drawings, in which:

FIGS. 1a and 1b show the magnetic design of typical prior art contact-less power transfer systems which require accurate alignment of the primary unit and secondary device;

FIGS. 6a, 6b, 6c, 6d, 6e and 6f show some alternative embodiment designs for the magnetic unit or a component of the magnetic unit of the primary unit;

FIGS. 8a–8f show the effect of flux guides (the thickness of the flux guide has been exaggerated for clarity);

FIG. 8a shows that without flux guides, the field tends to fringe into the air directly above the active area;

FIG. 8b shows the direction of current flow in the conductors in this particular embodiment;

FIG. 8c shows that the flux is contained within the flux guides when magnetic material is placed on top of the active area;

FIG. 8d shows a secondary device on top of the primary unit;

FIG. 8e shows a cross section of the primary unit without any secondary devices;

FIG. 8f shows a cross section of the primary unit with a secondary device on top and demonstrates the effect of using a secondary core with higher permeability than the flux guide.

FIG. 9a shows a particular coil arrangement with a net instantaneous current flow shown by the direction of the arrow;

FIG. 9b shows a similar coil arrangement to FIG. 9a except rotated by 90 degrees;

FIG. 9c shows the active area of the primary unit if the coil of FIG. 9a is placed on top of FIG. 9b. If the coil in FIG. 9a is driven in quadrature to FIG. 9b, the effect is a rotating magnetic dipole shown here.

FIGS. 11a–11c show various arrangements of secondary devices with axial degrees of rotation.

DETAILED DESCRIPTION OF THE INVENTION

Figure 2A:
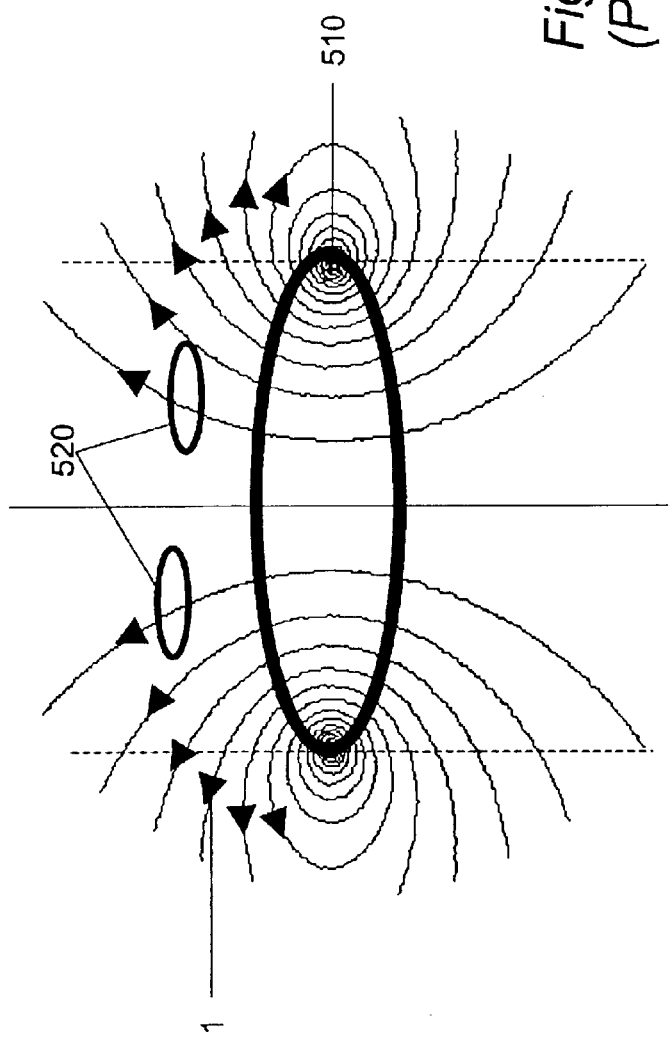
FIG. 2a shows the magnetic design of another typical prior art contact-less power transfer system which involves a large coil in the primary unit.

Referring firstly to FIGS. 1a and 1b, there is shown two examples of prior art contact-less power transfer systems which both require accurate alignment of a primary unit and a secondary device. This embodiment is typically used in toothbrush or mobile phone chargers.

FIG. 1a shows a primary magnetic unit 100 and a secondary magnetic unit 200. On the primary side, a coil 110 is wound around a magnetic core 120 such as ferrite. Similarly, the secondary side consists of a coil 210 wound around another magnetic core 220. In operation, an alternating current flows in to the primary coil 110 and generates lines of flux 1. When a secondary magnetic unit 200 is placed such that it is axially aligned with the primary magnetic unit 100, the flux 1 will couple from the primary into the secondary, inducing a voltage across the secondary coil 210.

FIG. 1b shows a split transformer. The primary magnetic unit 300 consists of a U-shaped core 320 with a coil 310 wound around it. When alternating current flows into the primary coil 310, changing lines of flux is generated 1. The secondary magnetic unit 400 consists of a second U-shaped core 420 with another coil 410 wound around it. When the secondary magnetic unit 400 is placed on the primary magnetic unit 300 such that the arms of the two U-shaped cores are in alignment, the flux will couple effectively into the core of the secondary 420 and induce voltage across the secondary coil 410.

Figure 2B:
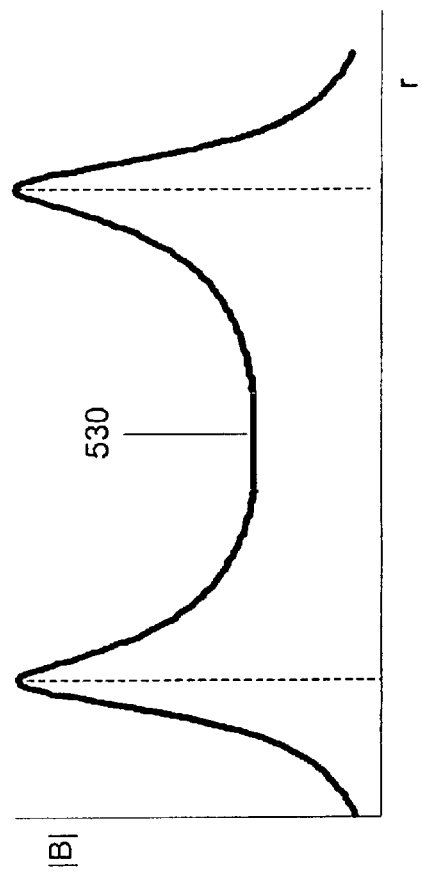
FIG. 2b shows the non-uniform field distribution inside the large coil at 5 mm distance from the plane of the coil, exhibiting a minimum in the centre.

FIG. 2a is another embodiment of prior art inductive systems typically used in powering radio frequency passive tags. The primary typically consists of a coil 510 covering a large area. Multiple secondary devices 520 will have voltage induced in it when they are within the area encircled by the primary coil 510. This system does not require the secondary coil 520 to be accurate aligned with the primary coil 510. FIG. 2b shows a graph of the magnitude of magnetic flux intensity across the area encircled by the primary coil 510 at 5 mm above the plane of the primary coil. It shows a non-uniform field, which exhibits a minimum 530 at the centre of the primary coil 510.

Figure 3:
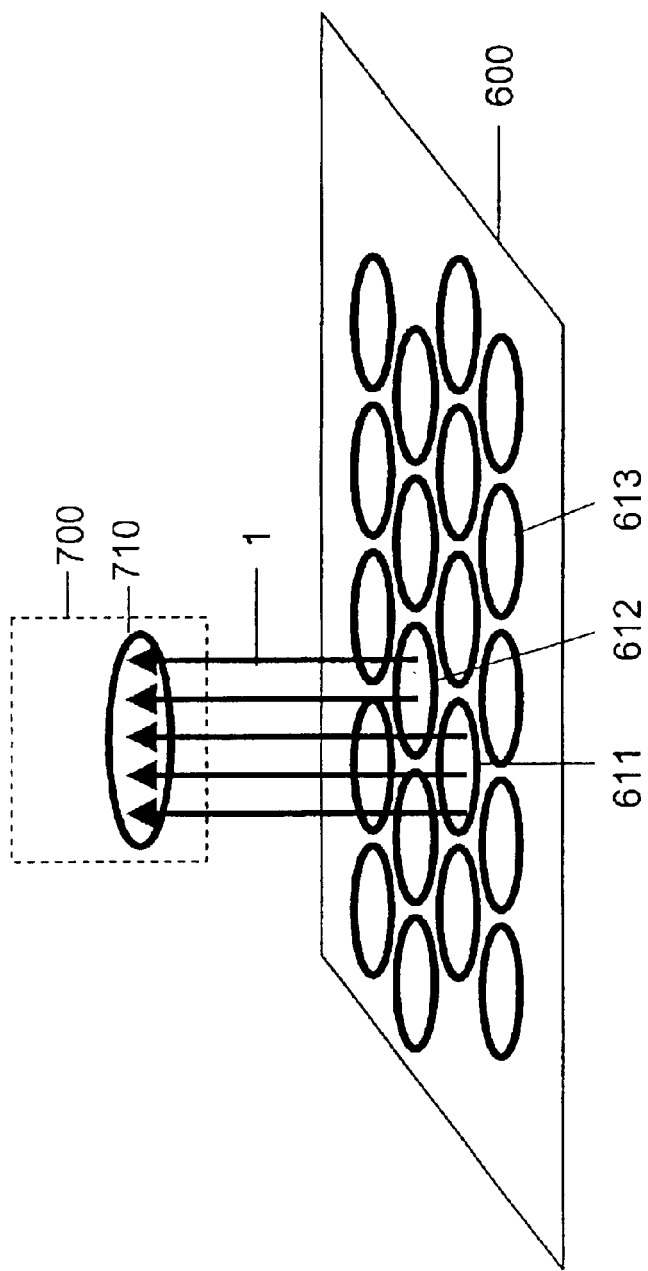
FIG. 3 shows a multiple-coil system where each coil is independently driven such that a localised field can be generated.

FIG. 3 is another embodiment of prior art inductive system where by a multiple coil array is used. The primary magnetic unit 600 consists of an array of coils including 611, 612, 613. The secondary magnetic unit 700 may consist of a coil 710. When the secondary magnetic unit 700 is in proximity to some coils in the primary magnetic unit 600, the coils 611, 612 are activated while other coils such as 613 remains inactive. The activated coils 611, 612 generate flux, some of which will couple into the secondary magnetic unit 700.

Figure 4A:
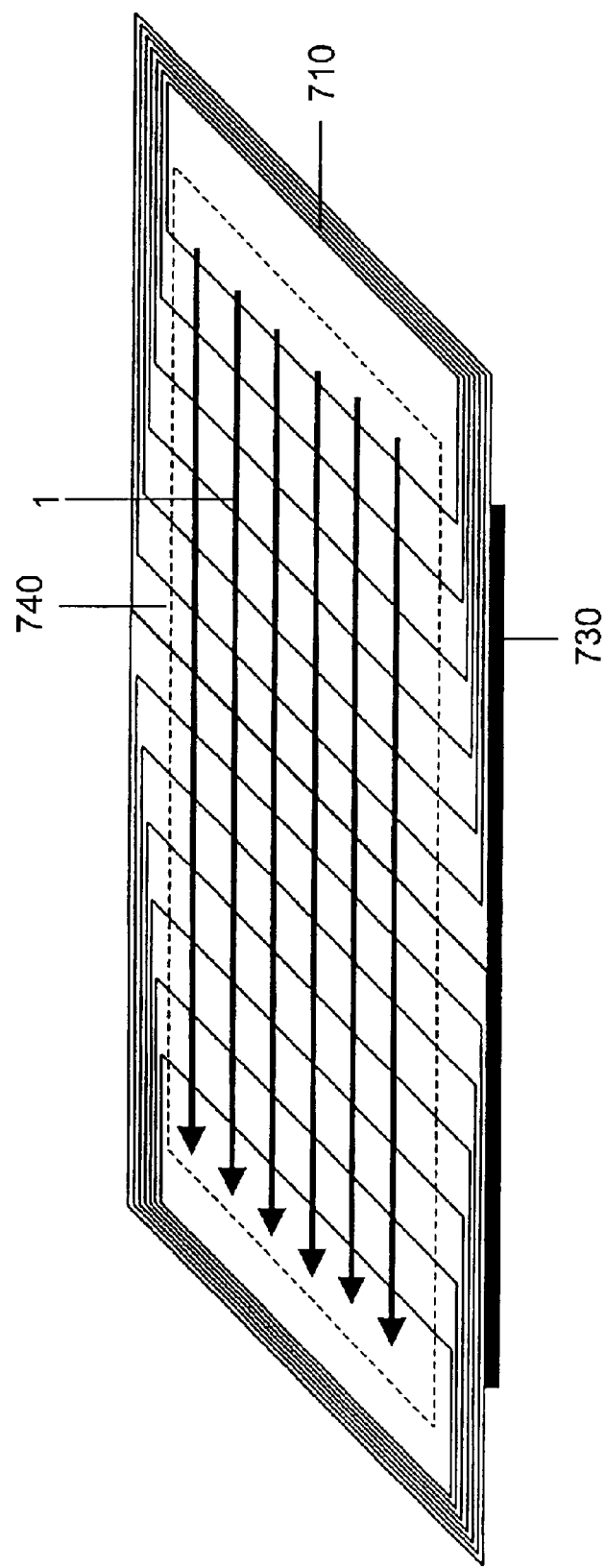
FIG. 4a shows an embodiment of the proposed system which demonstrates a substantial departure from prior art with no secondary devices present.
Figure 4B:
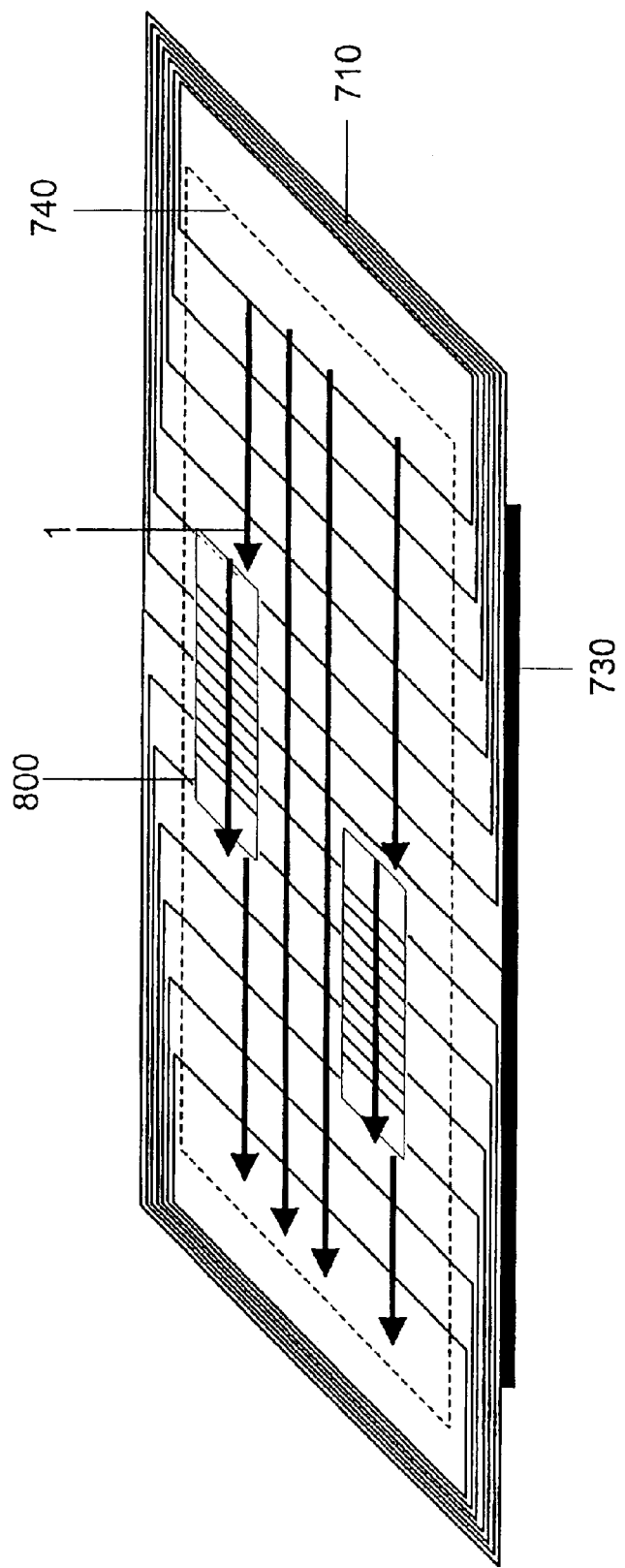
FIG. 4b shows an embodiment of the proposed system with two secondary devices present.

FIGS. 4a–4d show an embodiment of the proposed invention. FIG. 4a shows a primary coil 710 wound or printed in such a fashion that there is a net instantaneous current flow within the active area 740. For example, if a dc current flows through the primary coil 710, the conductors in the active area 740 would all have current flowing in the same direction. Current flowing through the primary coil 710 generates flux 1. A layer of magnetic material 730 is present beneath the active area to provide a return path for the flux. FIG. 4b shows the same primary magnetic unit as shown in FIG. 4a with two secondary devices 800 present. When the secondary devices 800 are placed in the correct orientation on top of the active area 740 of the primary magnetic unit, the flux 1 would flow through the magnetic core of the secondary devices 800 instead of flowing through the air. The flux 1 flowing through the secondary core would hence induce current in the secondary coil.

Figure 4C:
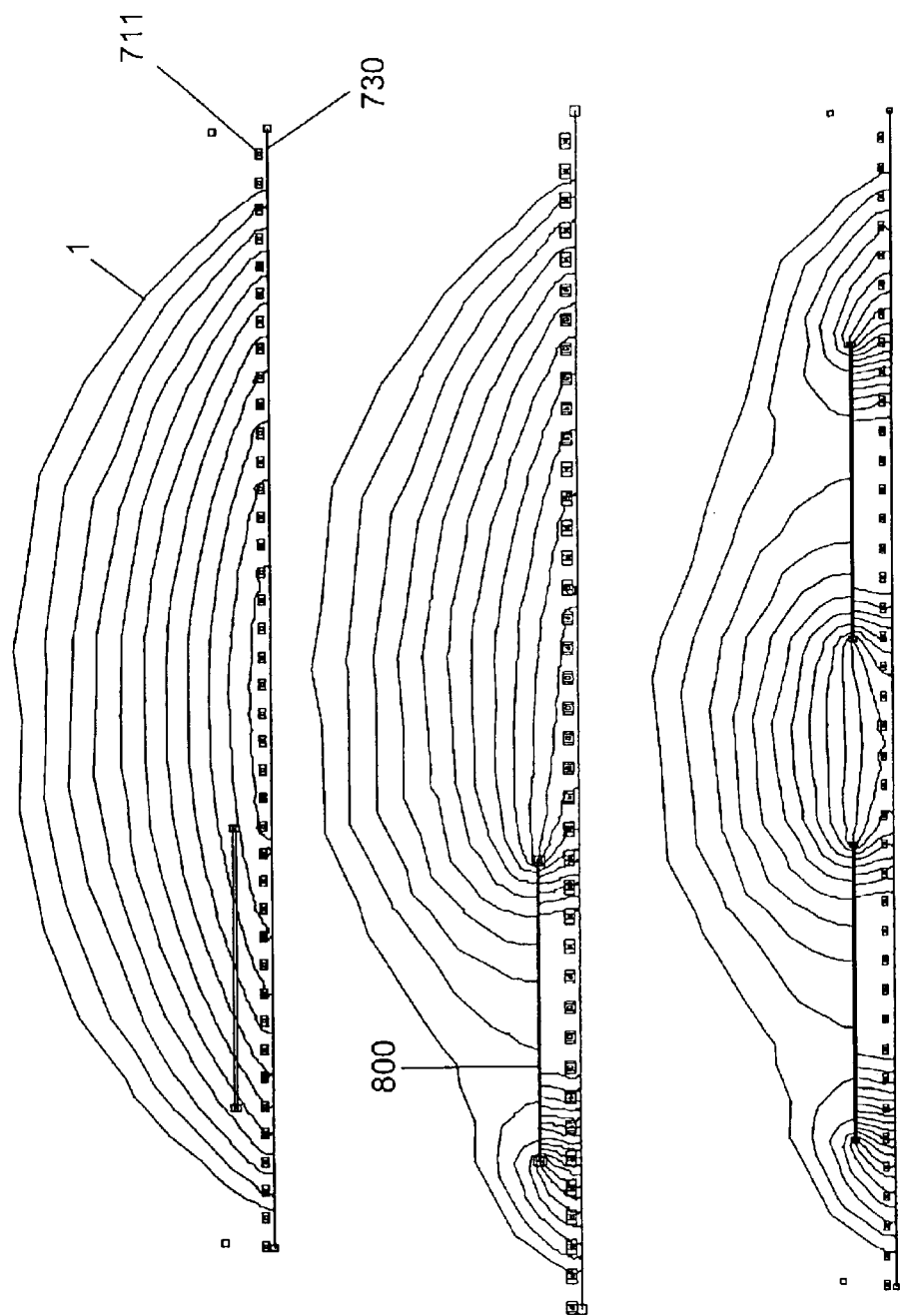
FIG. 4c shows a cross section of the active area of the primary unit and the contour lines of the magnetic flux density generated by the conductors.

FIG. 4c shows some contour lines for the flux density of the magnetic field generated by the conductors 711 in the active area 740 of the primary magnetic unit 700. There is a layer of magnetic material 730 beneath the conductors to provide a low impedance return path for the flux.

Figure 4D:
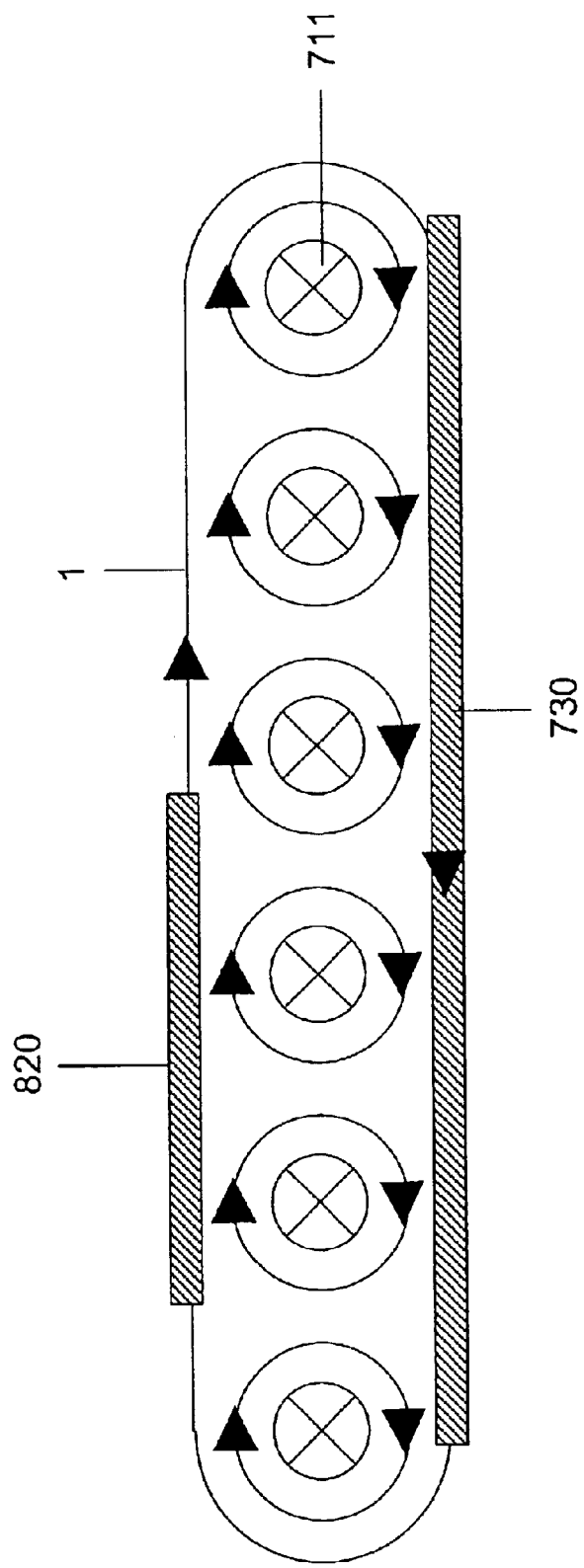
FIG. 4d shows the magnetic circuit for this particular embodiment of the proposed invention.

FIG. 4d shows a cross-section of the active area 740 of the primary magnetic unit 700. A possible path for the magnetic circuit is shown. The magnetic material 730 provides a low reluctance path for the circuit and also the magnetic core 820 of the secondary magnetic device 800 also provides a low reluctance path. This minimizes the distance the flux has to travel through the air and hence minimizes leakage.

Figure 5:
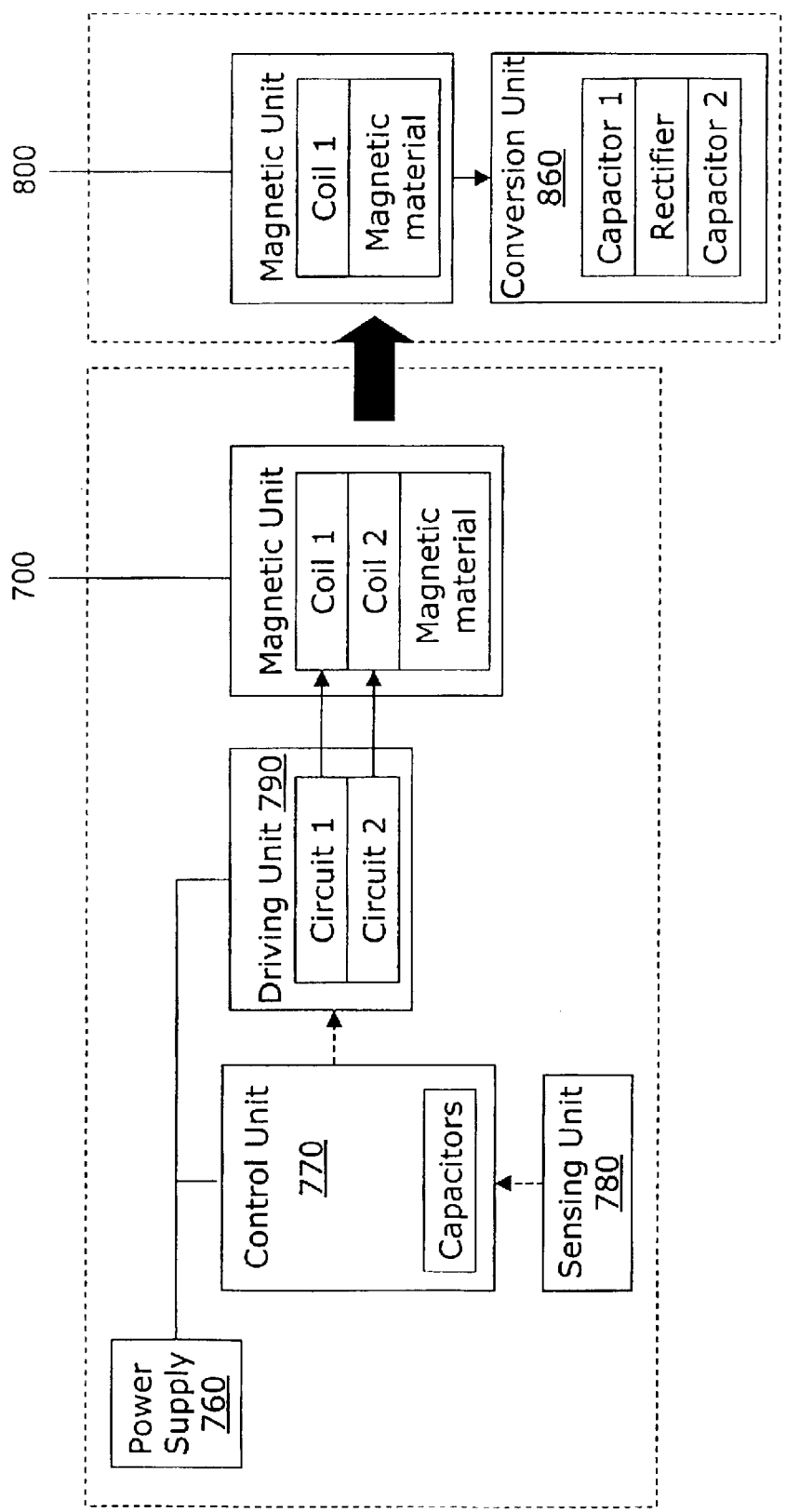
FIG. 5 shows a schematic drawing of an embodiment of the primary unit and the secondary device.

FIG. 5 shows a schematic drawing of an embodiment of the whole system of the proposed invention. In this embodiment, the primary unit consists of a power supply 760, a control unit 770, a sensing unit 780 and a magnetic unit 700. The power supply 760 converts the mains (or other sources of power) into a dc supply at an appropriate voltage for the system. The control unit 770 controls the driving unit 790 which drives the magnetic unit 700. In this embodiment, the magnetic unit consists of two independently driven components, coil 1 and coil 2, arranged such that the conductors in the active area of coil 1 would be perpendicular to the conductors in the active area of coil 2. When the primary unit is activated, the control unit causes a 90-degree phase shift between the alternating current that flows through coil 1 and coil 2. This creates a rotating magnetic dipole on the surface of the primary magnetic unit 700 such that a secondary device would be able to receive power regardless of its rotational orientation (See FIGS. 9a–9c). In standby mode where no secondary devices are present, the primary is detuned and current flow into the magnetic unit 700 is minimised. When a secondary device is placed on top of the active area of the primary unit, the inductance of the primary magnetic unit 700 is changed. This brings the primary circuit into resonance and the current flow is maximised. When there are two secondary devices present on the primary unit, the inductance is changed to yet another level and the primary circuit is again detuned. At this point, the control unit 770 uses feedback from the sensing unit 780 to switch another capacitor into the circuit such it is tuned again and current flow is maximised. In this embodiment, the secondary devices are of a standard size and a maximum of six standard-sized devices can receive power from the primary unit simultaneously. Due to the standard-sizes of the secondary devices, the change in inductance due to the change in secondary devices in proximity is quantized to a number of predefined levels such that only a maximum of 6 capacitances is required to keep the system operating at resonance.

Figure 6C:
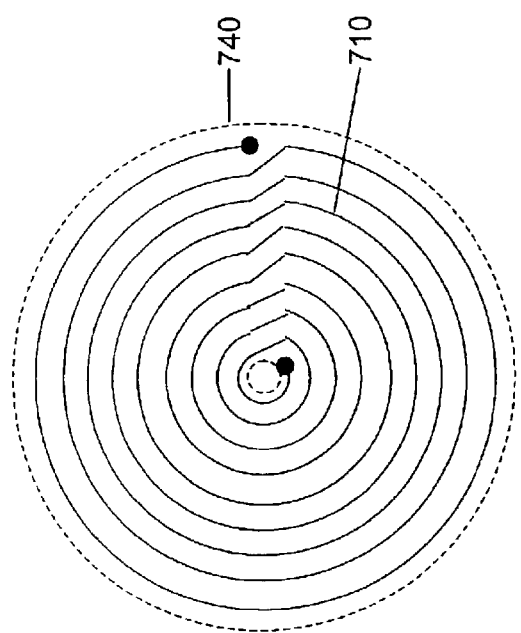
Figure 6D:
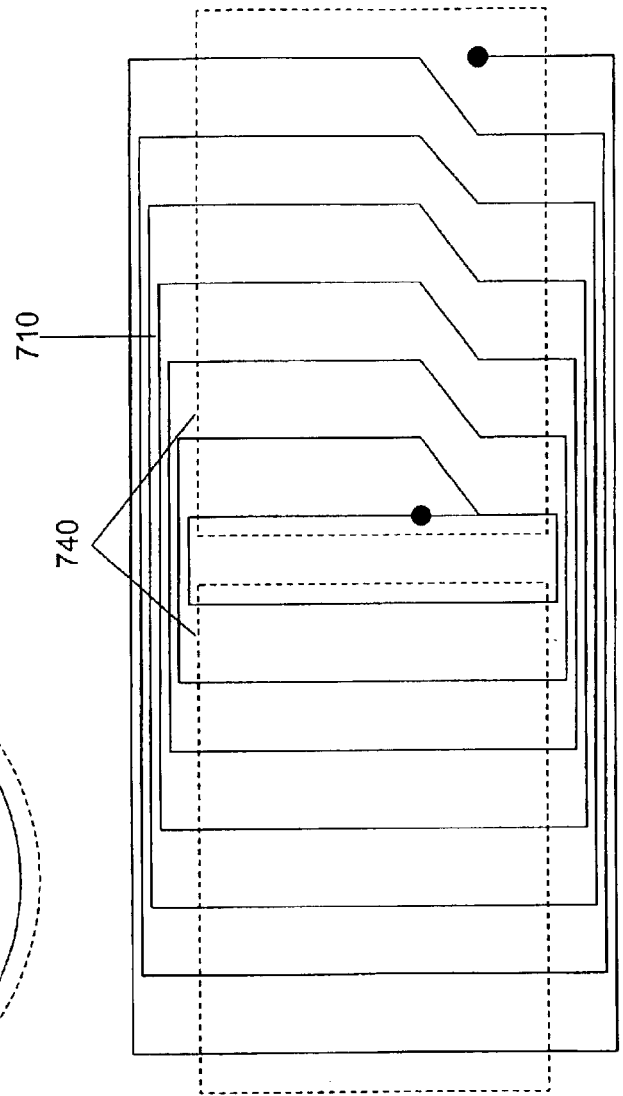
Figure 6E:
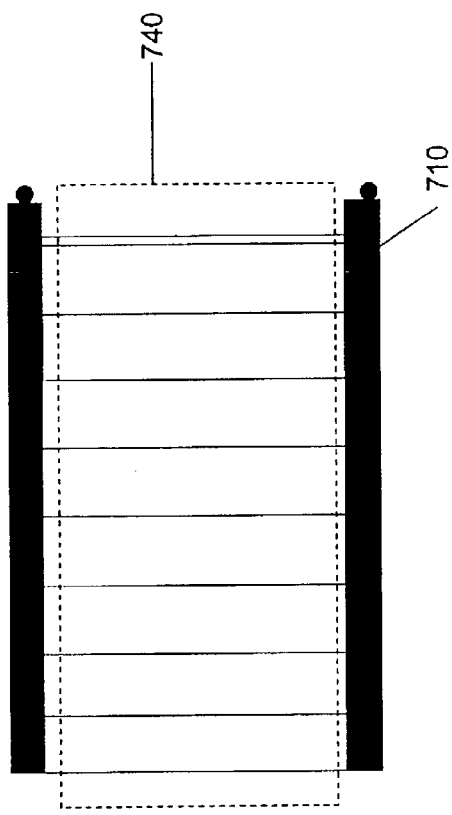

FIGS. 6a to 6f show a number of different embodiments for the coil component of the primary magnetic unit. These embodiments may be implemented as the only coil component of the primary magnetic unit, in which case the rotation of the secondary device is important to the power transfer. These embodiments may also be implemented in combination, not excluding embodiments which are not illustrated here. For example, two coils illustrated in FIG. 6a may be placed at 90 degrees to each other to form a single magnetic unit. In FIGS. 6a to 6e, the active area 740 consists of a series of conductors with net current generally flowing in the same direction. In certain configurations, such as FIG. 6c, there is no substantial linkage when the secondary device is placed directly over the centre of the coil and hence power is not transferred. In FIG. 6d, there is no substantial linkage when the secondary device is positioned in the gap between the two active areas 740.

Figure 6F:
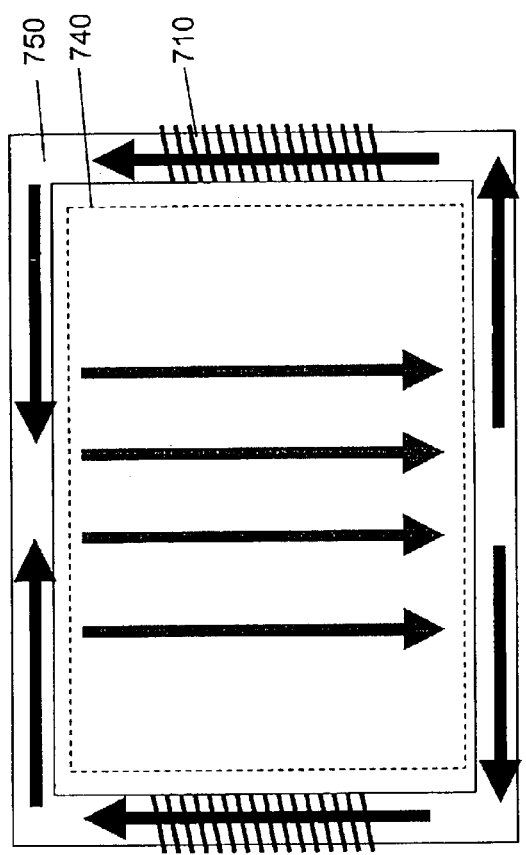

FIG. 6f shows a specific coil configuration for the primary unit adapted to generate electromagnetic field lines substantially parallel to a surface of the primary unit within the active area 740. Two primary windings 710, one on either side of the active area 740, are formed about opposing arms of a generally rectangular flux guide 750 made out of a magnetic material, the primary windings 710 generating opposing electromagnetic fields. The flux guide 750 contains the electromagnetic fields and creates a magnetic dipole across the active area 740 in the direction of the arrows indicated on FIG. 6f. When a secondary device is placed in the active area 740 in a predetermined orientation, a low reluctance path is created and flux flows through the secondary device, causing effective coupling and power transfer.

Figure 7B:
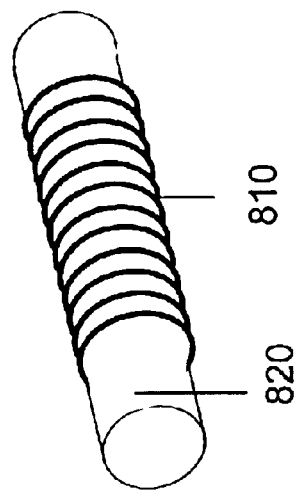
FIGS. 7a and 7b show some embodiment designs for the magnetic unit of the secondary device.
Figure 7A:
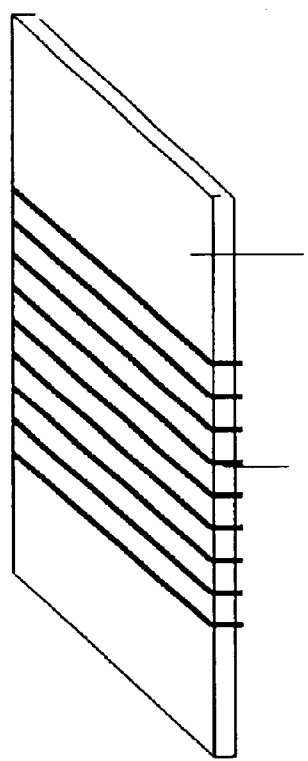

FIGS. 7a and 7b are embodiments of the proposed secondary devices. A winding 810 is wound around a magnetic core 820. Two of these may be combined in a single secondary device, at right angles for example, such that the secondary device is able to effectively couple with the primary unit at all rotations. These may also be combined with standard coils, as the ones shown in FIG. 2a 520 to eliminate dead spots.

FIGS. 8a–8f show the effect of flux guides 750 positioned on top of the active area. The thickness of the material has been exaggerated for the sake of clarity but in reality would be in the order of millimetres thick. The flux guides 750 will minimize leakage and contain the flux at the expense of reducing the amount of flux coupled to the secondary device. In FIG. 8a, a primary magnetic unit is shown without flux guides 750. The field will tend to fringe into the air directly above the active area. With flux guides 750, as shown in FIGS. 8b to 8f, the flux is contained within the plane of the material and leakage is minimised. In FIG. 8e, when there is no secondary device 800 on top, the flux remains in the flux guide 750. In FIG. 8f, when a secondary device 800 is present with a relatively more permeable material as the core, part of the flux will flow via the secondary device. The permeability of the flux guide 750 can be chosen such that it is higher than that of typical metals such as steel. When other materials such as steel, which are not part of secondary devices 800, are placed on top, most of the flux will remain in the flux guide 750 instead of travelling through the object. The flux guide 750 may not be a continuous layer of magnetic material but may have small air gaps in them to encourage more flux flow into the secondary device 800 when it is present.

FIGS. 9a–9c shows an embodiment of a primary unit whereby more than one coil is used. FIG. 9a shows a coil 710 with an active area 740 with current flow parallel to the direction of the arrow 1. FIG. 9b shows a similar coil arranged at 90 degrees to the one in FIG. 9a. When these two coils are placed on top of each other such that the active area 740 overlaps, the active area would look like the illustration in FIG. 9c. Such an embodiment would allow the secondary device to be at any rotation on top of the primary unit and couple effectively.

Figure 10:
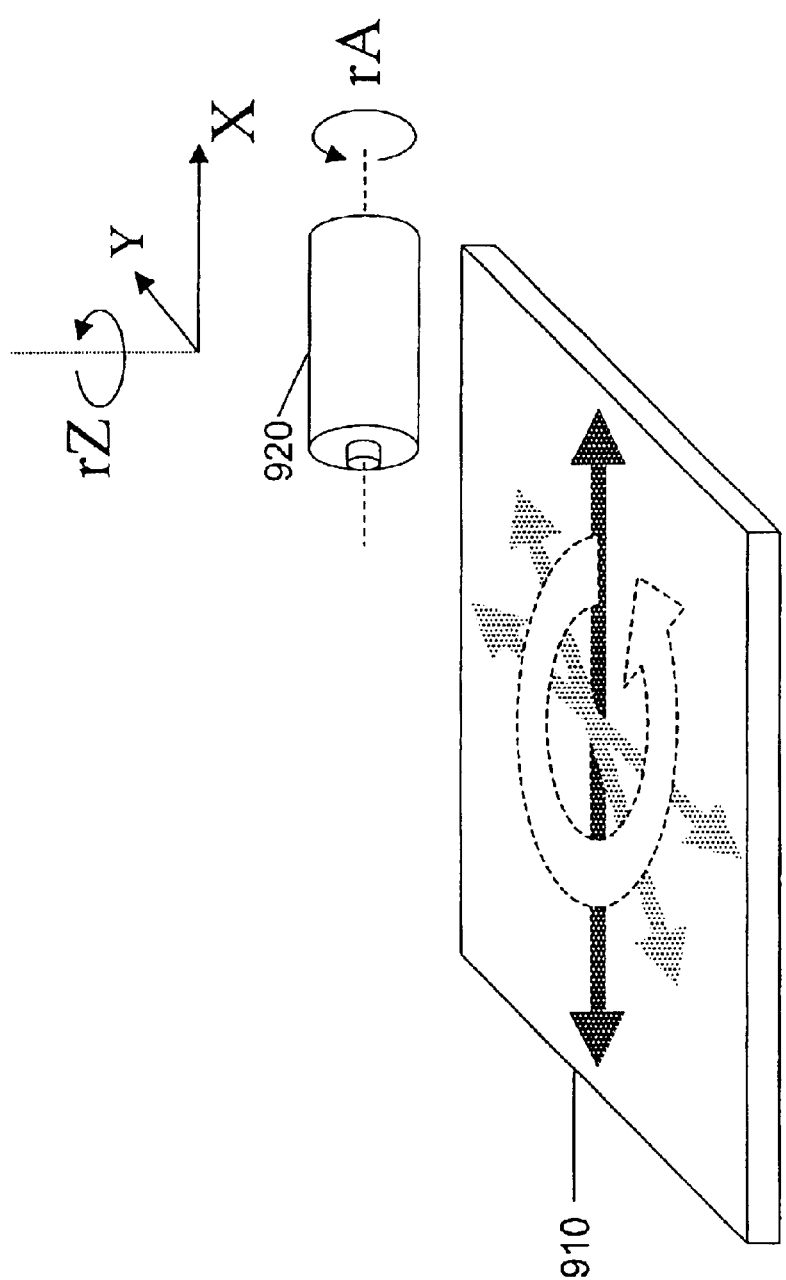
FIG. 10 shows the case where the secondary device has an axial degree of rotation.

FIG. 10 shows an embodiment where the secondary device has an axial degree of rotation, for example where it is, or it is embedded within, a battery cell. In this embodiment the secondary device may be constructed such that it couples to the primary flux when in any axial rotation (rA) relative to the primary unit (910), as well as having the same degrees of freedom described above (i.e. translational (X,Y) and optionally rotational perpendicular to the plane of the primary (rZ).

FIG. 11a shows one arrangement where a rechargeable battery cell 930 is wrapped with an optional cylinder of flux-concentrating material 931 which is itself wound with copper wire 932. The cylinder may be long or short relative to the length of the cell.

FIG. 11b shows another arrangement where the flux-concentrating material 931 covers only part of the surface of the cell 930, and has copper wire 932 wrapped around it (but not the cell). The material and wire may be conformed to the surface of the cell. Their area may be large or small relative to the circumference of the cell, and long or short relative to the length of the cell.

FIG. 11c shows another arrangement where the flux-concentrating material 931 is embedded within the cell 930 and has copper wire 932 wrapped around it. The material may be substantially flat, cylindrical, rod-like, or any other shape, its width may be large or small relative to the diameter of the cell, and its length may be large or small relative to the length of the cell.

In any case shown in FIGS. 10 and 11a–11c, any flux-concentrating material may also be a functional part of the battery enclosure (for example, an outer zinc electrode) or the battery itself (for example, an inner electrode).

In any case shown in FIGS. 10 and 11a–11c, the power may be stored in a smaller standard cell (e.g. AAA size) fitted within the larger standard cell enclosure (e.g. AA).

Figure 12A:
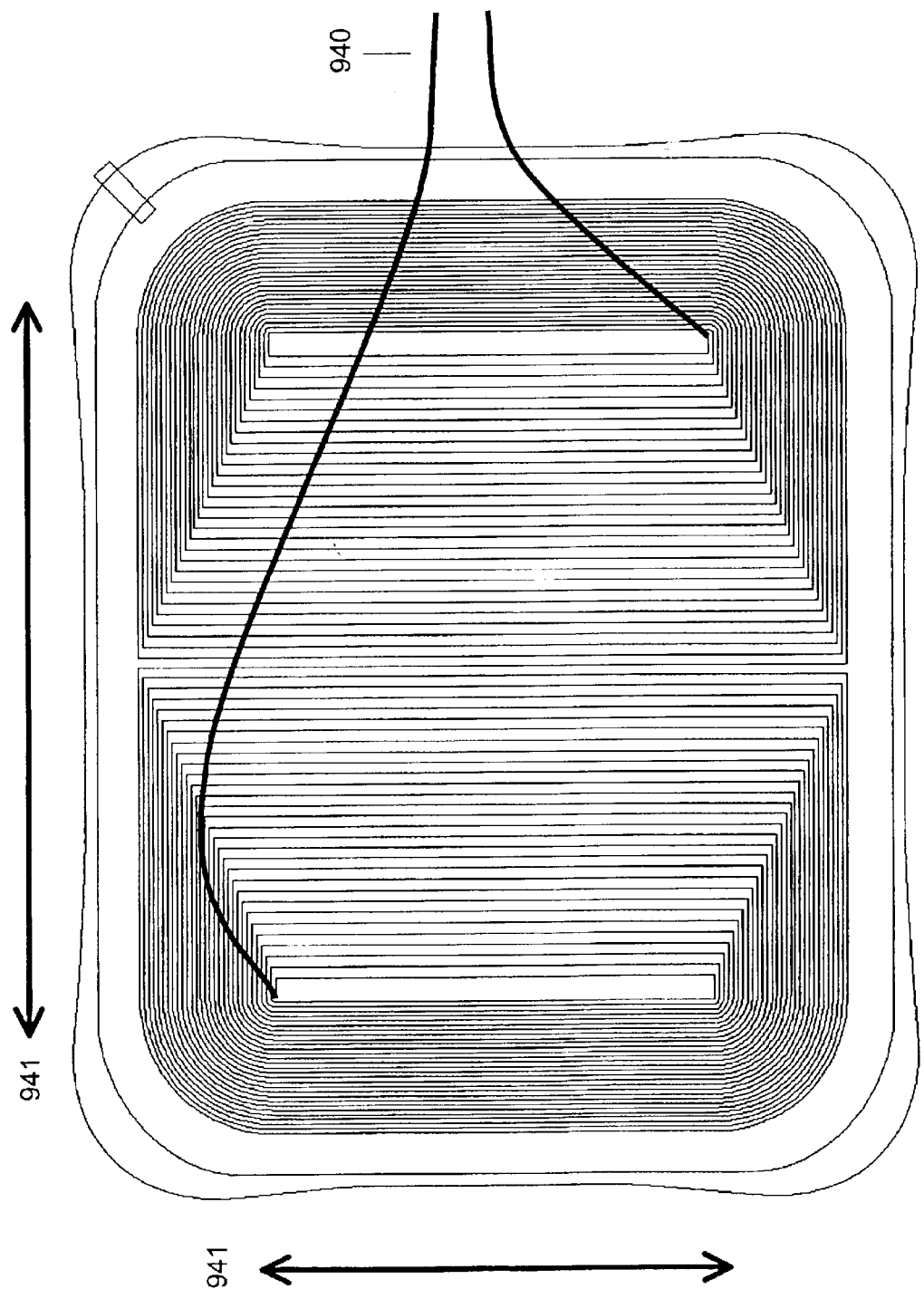
FIG. 12a and FIG. 12b show another embodiment of the type of coil arrangement shown in FIG. 9a and FIG. 9b.
Figure 12B:
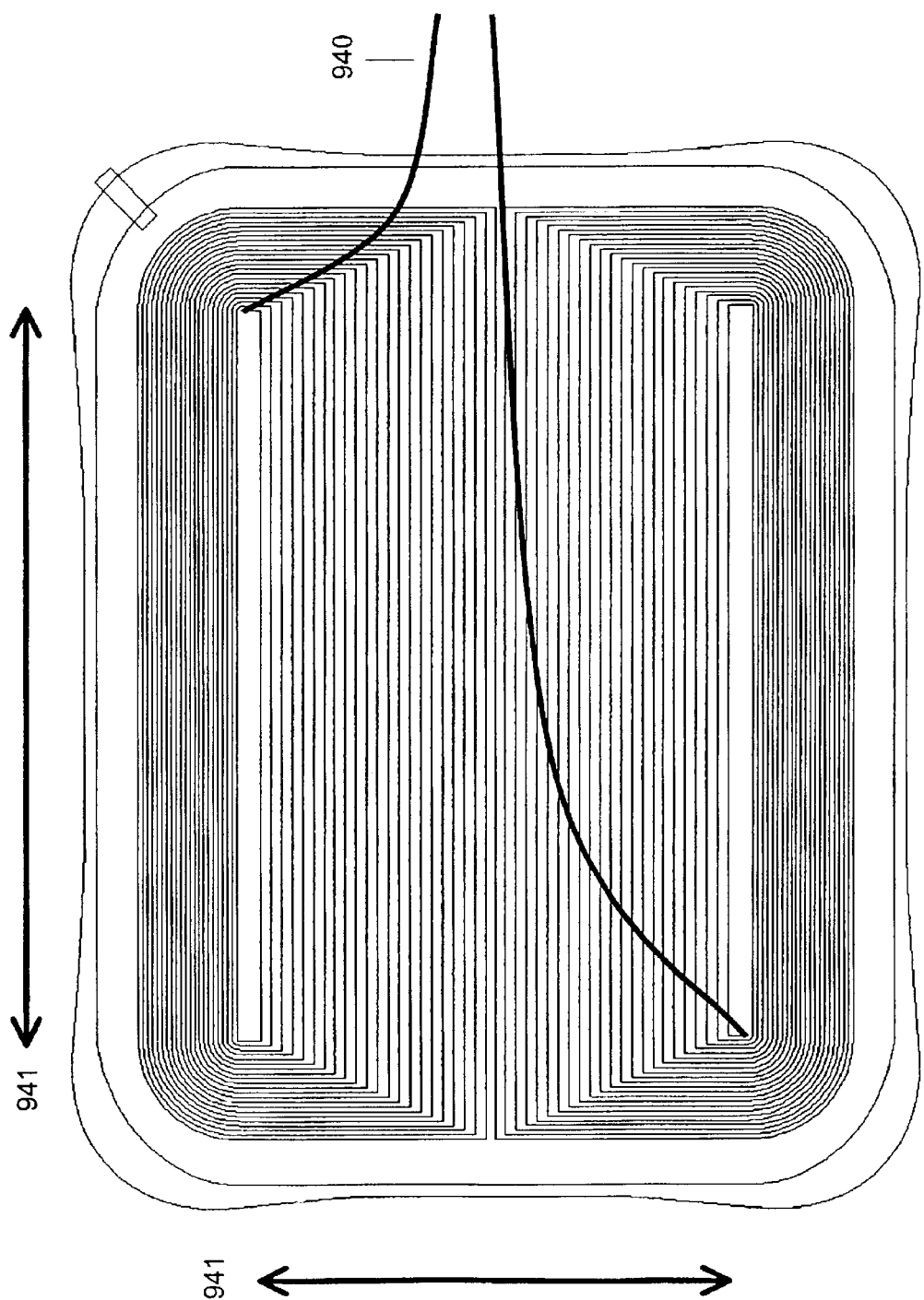

FIGS. 12a and 12b show an embodiment of a primary unit similar to that shown in FIGS. 9a–9c. FIG. 12a shows a coil generating a field in a direction horizontal to the page, FIG. 12b shows another coil generating a field vertical to the page, and the two coils would be mounted in a substantially coplanar fashion, possibly with one above the other, or even intertwined in some fashion. The wire connections to each coil are shown 940 and the active area is represented by the arrows 941.

Figure 13:
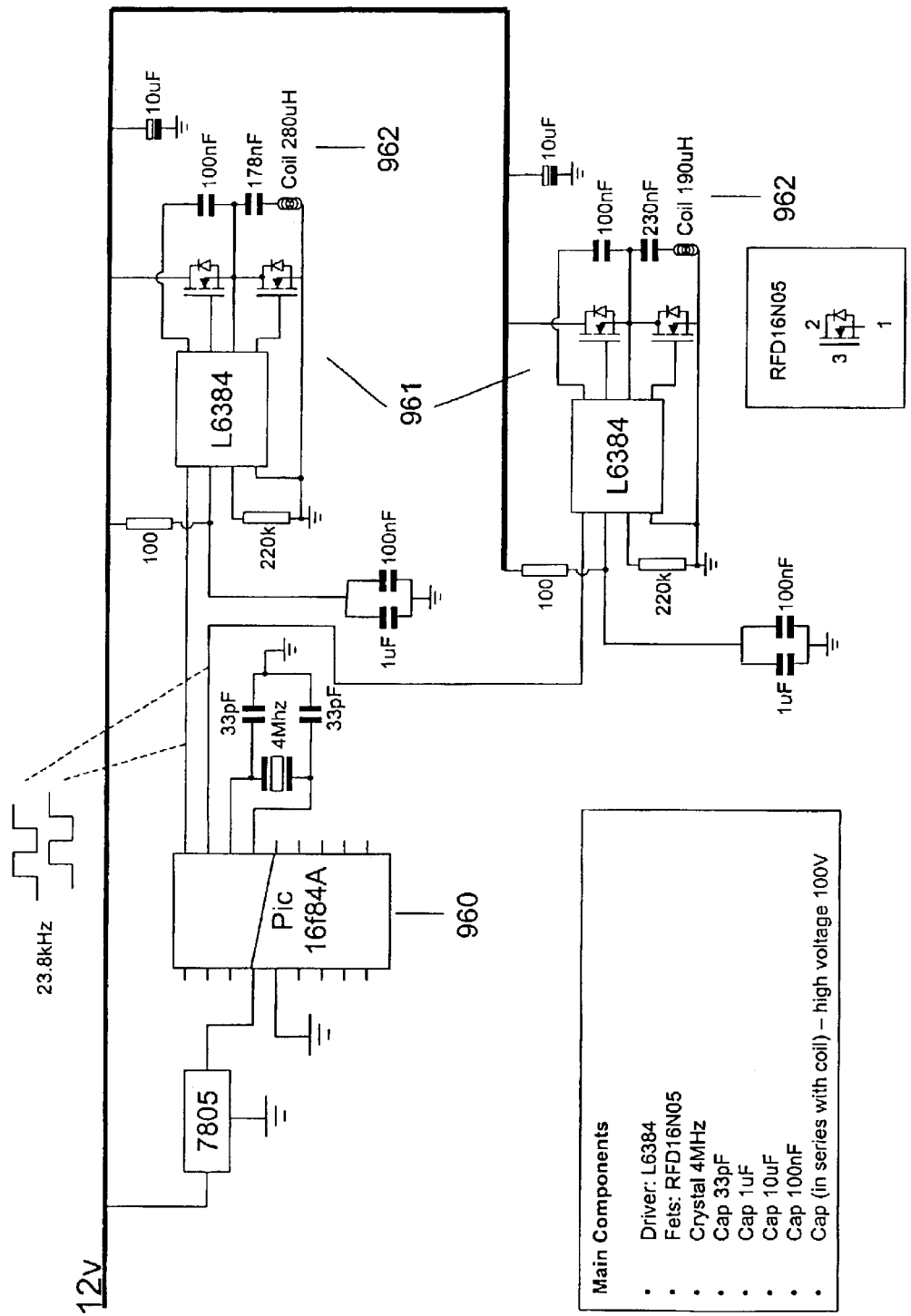
FIG. 13 shows a simple embodiment of driving unit electronics.

FIG. 13 shows a simple embodiment of the Driving Unit (790 of FIG. 5). In this embodiment there is no Control Unit. The PIC processor 960 generates two 23.8 kHz square waves 90 degrees out of phase with one another. These are amplified by components 961 and driven into two coil components 962, which are the same magnetic units shown in FIG. 12a and FIG. 12b. Although the driving unit is providing square waves the high resonant "Q" of the magnetic units shapes this into a sinusoidal waveform.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

In the drawings, "L6384" can denote a high voltage half bridge driver IC made by STMicroelectronics; "Pic16f84a" can denote a CMOS Flash/EEPROM-based 8-bit microcontroller from Microchip Technology Inc.; "RFD16N05" can denote an N-channel power MOSFET from Fairchild Semiconductor; "7805" can denote a generic three terminal regulator, made by many companies—one example is Maplin Electronics Ltd.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A system for transferring power without requiring direct electrical conductive contacts, the system comprising:
   i) a primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are generally parallel to the plane of the surface within the active area; and
   ii) at least one secondary device including at least one electrical conductor;
wherein the active area of the primary unit has a perimeter large enough to surround the electrical conductor of the at least one secondary device in any orientation thereof substantially parallel to the surface of the primary unit in the active area, such that when the at least one secondary device is placed on or in proximity to the active area in a predetermined orientation, the electromagnetic field induces a current in the at least one conductor of the at least one secondary device.

2. A system as claimed in claim 1, wherein the primary unit includes a plurality of conductors configured so as to be able to generate a magnetic dipole that is switchable between different directions.

3. A system as claimed in claim 2, wherein the plurality of conductors is configured so as to be able to generate a rotating magnetic dipole in or substantially parallel to the laminar surface.

4. A system as claimed in claim 1, wherein the at least one conductor is substantially distributed and/or contained within the active area.

5. A system as claimed in claim 1, wherein the active area is provided with a substrate of a magnetic material.

6. A system as claimed in claim 1, wherein the primary unit includes at least one selectively operable capacitor adapted that a capacitance of a circuit including the at least one conductor and the at least one capacitor may be changed in response to a detected presence of one or more secondary devices.

7. A system as claimed in claim 1, wherein the active area is provided with a flux guide having a relative permeability less than that of the core of the at least one secondary device.

8. A system as claimed in claim 1, wherein the primary unit includes a power supply.

9. A system as claimed in claim 1, wherein the at least one conductor in the secondary device is wound about a core that serves to concentrate flux therein.

10. A system as claimed in claim 9, wherein the core is a magnetically permeable material.

11. A system as claimed in claim 10, wherein the core is an amorphous magnetic material.

12. A system as claimed in claim 9, having a core thickness of 2 mm or less.

13. A system as claimed in claim 12, having a core thickness of 1 mm or less.

14. A system as claimed in claim 1, wherein the secondary device comprises an inductively rechargeable battery or cell.

15. A system as claimed in claim 14, wherein the inductively rechargeable battery or cell includes at least one conductor wound about a flux concentrating means.

16. A system as claimed in claim 1, wherein the secondary device includes at least one electrical conductor having a substantially flat form factor.

17. A system as claimed in claim 16, wherein the secondary device has a primary axis and is adapted to be rechargeable when in any rotation about its axis.

18. A system as claimed in claim 1, wherein the primary unit includes a pair of conductors having adjacent coplanar windings which have mutually substantially parallel linear sections arranged so as to produce a substantially uniform electromagnetic field extending generally parallel to the plane of the windings but substantially at right angles to the parallel sections.

19. A system as claimed in claim 18, wherein the windings are formed in a generally spiral shape, comprising a series of turns having substantially parallel straight sections.

20. A system as claimed in claim 18, wherein the primary unit includes first and second pairs of conductors which are superimposed in substantially parallel planes with the substantially parallel linear sections of the first pair arranged generally at right angles to the substantially parallel linear sections of the second pair, and further comprising a driving circuit which is arranged to drive them in such a way as to generate a resultant field which rotates in a plane substantially parallel to the planes of the windings.

21. A primary unit for transferring power in a non-conductive manner to at least one secondary device including at least one electrical conductor, the primary unit having a substantially laminar surface with at least one electrical conductor that generates an electromagnetic field when a current flows therethrough and having an active area defined within a perimeter of the surface, the at least one conductor of the primary unit being arranged such that electromagnetic field lines generated by the at least one conductor of the primary unit are substantially parallel to a plane of the surface within the active area, and wherein the active area has a perimeter large enough to surround the conductor of the at least one secondary device in any orientation thereof substantially parallel to the surface of the primary unit in the active area.

22. A primary unit as claimed in claim 21, including a plurality of primary unit conductors configured so as to be able to generate a magnetic dipole that is switchable between different directions.

23. A primary unit as claimed in claim 22, wherein the plurality of primary unit conductors is configured so as to be able to generate a rotating magnetic dipole in or substantially parallel to the laminar surface.

24. A primary unit as claimed in claim 21, wherein the at least one primary unit conductor is substantially distributed and/or contained within the active area.

25. A primary unit as claimed in claim 21, wherein the active area is provided with a substrate of a magnetic material.

26. A primary unit as claimed in claim 21, including at least one selectively operable capacitor adapted that a capacitance of a circuit including the at least one primary unit conductor and the at least one capacitor may be changed in response to a detected presence of one or more secondary devices.

27. A primary unit as claimed in claim 21, wherein the primary unit includes a power supply.

28. A primary unit as claimed in claim 21, wherein the active area is provided with a flux guide having a relative permeability less than that of any core that may be provided in the at least one secondary device.

29. A primary unit as claimed in claim 21, including a pair of conductors having adjacent coplanar windings which have mutually substantially parallel linear sections arranged so as to produce a substantially uniform electromagnetic field extending generally parallel to the plane of the windings but substantially at right angles to the parallel sections.

30. A primary unit as claimed in claim 29, wherein the windings are formed in a generally spiral shape, comprising a series of turns having substantially parallel straight sections.

31. A primary unit as claimed in claim 29, including first and second pairs of conductors which are superimposed in substantially parallel planes with the substantially parallel linear sections of the first pair arranged generally at right angles to the substantially parallel linear sections of the second pair, and further comprising a driving circuit which is arranged to drive them in such a way as to generate a resultant field which rotates in a plane substantially parallel to the planes of the windings.

32. A method of transferring power in a non-conductive manner from a primary unit to a secondary device, the primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are generally parallel to the plane of the surface within the active area, and the secondary device having at least one electrical conductor,
wherein the active area has a perimeter large enough to surround the conductor of the at least one secondary device in any orientation thereof substantially parallel to the surface of the primary unit within the active area and wherein flux lines of the electromagnetic field link with the conductor of the secondary device when the device is placed on or in proximity to the active area in a predetermined orientation.

33. A method according to claim 32, wherein the primary unit includes a plurality of conductors which generate a magnetic dipole that is switchable between different directions.

34. A method according to claim 33, wherein the plurality of conductors generate a rotating magnetic dipole in or substantially parallel to the laminar surface.

35. A method according to claim 32, wherein the at least one primary unit conductor is substantially distributed and/or contained within the active area.

36. A method according to claim 32, wherein the active area is provided with a substrate of a magnetic material and wherein the magnetic material completes a magnetic circuit.

37. A method according to claim 32, wherein the primary unit includes at least one capacitor that is switched in or out such that a capacitance of a circuit including the at least one primary unit conductor and the at least one capacitor may be changed in response to a detected presence of one or more secondary devices.

38. A method according to claim 32, wherein the active area is provided with a flux guide having a relative permeability less than that of any core that may be provided in the at least one secondary device.

39. A system for transferring power without requiring direct electrical conductive contacts, the system comprising:
i) a primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area; and
ii) at least one secondary device including at least one electrical conductor; wherein the active area of the primary unit has a perimeter large enough to surround the electrical conductor of the at least one secondary device in any orientation thereof substantially parallel to the surface of the primary unit in the active area, such that when the at least one secondary device is placed on or in proximity to the active area in a predetermined orientation, the electromagnetic field induces a current in the at least one conductor of the at least one secondary device.

40. A primary unit for transferring power in a non-conductive manner to at least one secondary device including at least one electrical conductor, the primary unit having a substantially laminar surface with at least one electrical conductor that generates an electromagnetic field when a current flows therethrough and having an active area defined within a perimeter of the surface, the at least one conductor of the primary unit being arranged such that electromagnetic field lines generated by the at least one conductor of the primary unit are substantially parallel to a plane of the surface within the active area, and wherein the active area has a perimeter large enough to surround the conductor of the at least one secondary device in any orientation thereof substantially parallel to the surface of the primary unit in the active area.

41. A method of transferring power in a non-conductive manner from a primary unit to a secondary device, the primary unit having a substantially laminar surface with at least one electrical conductor that generates an electromagnetic field when a current flows therethrough and having an active area defined within a perimeter of the surface, the at least one conductor being arranged such that electromagnetic field lines generated by the at least one conductor are substantially parallel to the plane of the surface within the active area, and the secondary device having at least one electrical conductor, wherein the active area has a perimeter large enough to surround the conductor of the at least one secondary device in any orientation thereof substantially parallel to the surface of the primary unit within the active area and wherein flux lines of the electromagnetic field link with the conductor of the secondary device when this is placed on or in proximity to the active area.

* * * * *